(12) United States Patent
Seki et al.

(10) Patent No.: US 10,308,291 B2
(45) Date of Patent: Jun. 4, 2019

(54) CARGO BED GATE OPENING/CLOSING MECHANISM OF TRUCK

(71) Applicant: Honda Access Corp., Niiza-shi, Saitama (JP)

(72) Inventors: Kunihiko Seki, Niiza (JP); Yuta Watanabe, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 0 days.

(21) Appl. No.: 15/720,243

(22) Filed: Sep. 29, 2017

(65) Prior Publication Data

US 2018/0086392 A1 Mar. 29, 2018

(30) Foreign Application Priority Data

Sep. 29, 2016 (JP) .................................. 2016-191019
Dec. 28, 2016 (JP) .................................. 2016-254904

(51) Int. Cl.
| | | |
|---|---|---|
| *B62D 33/02* | (2006.01) | |
| *B62D 33/027* | (2006.01) | |
| *B62D 33/037* | (2006.01) | |
| *B62D 33/077* | (2006.01) | |
| *B62D 33/03* | (2006.01) | |

(52) U.S. Cl.
CPC ..... *B62D 33/0273* (2013.01); *B62D 33/0276* (2013.01); *B62D 33/03* (2013.01); *B62D 33/037* (2013.01); *B62D 33/077* (2013.01)

(58) Field of Classification Search
CPC ............ B62D 33/0273; B62D 33/0276; B62D 33/03; B62D 33/037; B62D 33/077

USPC ................. 296/57.1, 50, 146.8, 51
See application file for complete search history.

(56) References Cited

U.S. PATENT DOCUMENTS

| | | | | |
|---|---|---|---|---|
| 8,246,098 B2* | 8/2012 | Cheung | .............. | B62D 33/0273 16/366 |
| 2003/0015885 A1* | 1/2003 | Landwehr | ............... | B60P 1/435 296/61 |
| 2012/0126564 A1* | 5/2012 | Hausler | .............. | B62D 33/0273 296/62 |
| 2012/0324793 A1* | 12/2012 | Abbasi | ............... | B62D 33/0273 49/168 |

FOREIGN PATENT DOCUMENTS

JP          1-148937 U       10/1989

* cited by examiner

*Primary Examiner* — Joseph D. Pape
(74) *Attorney, Agent, or Firm* — Westerman, Hattori, Daniels & Adrian, LLP

(57) ABSTRACT

A rear gate arranged at a rear end of a cargo bed of a truck includes: a support frame arranged at the rear end of the cargo bed and extending along a vehicle width direction; a pair of first and second gate frame bodies arranged at both ends in the vehicle width direction of the support frame; and a first divided gate and a second divided gate supported openably from the first and second gate frame bodies. The rear gate includes a pair of first and second opening/closing switching units configured to switch an opened/closed state of the rear gate. Operation levers of the first and second opening/closing switching units are operated to switch among a vertical opening state, a horizontal opening state, and a locked state restricting from the vertical opening and the horizontal opening.

6 Claims, 21 Drawing Sheets

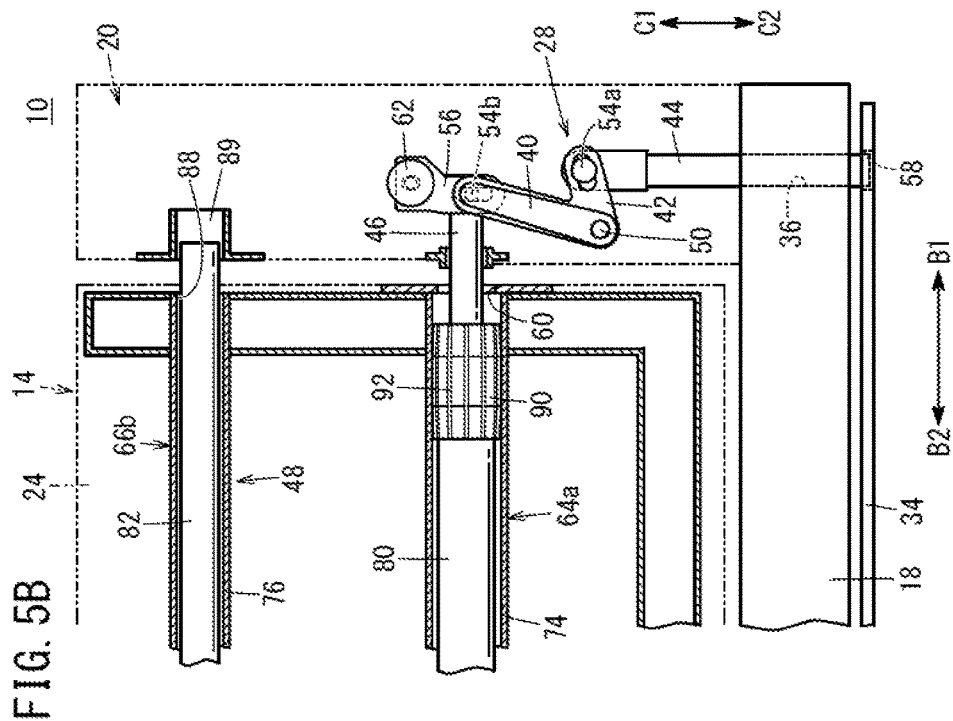
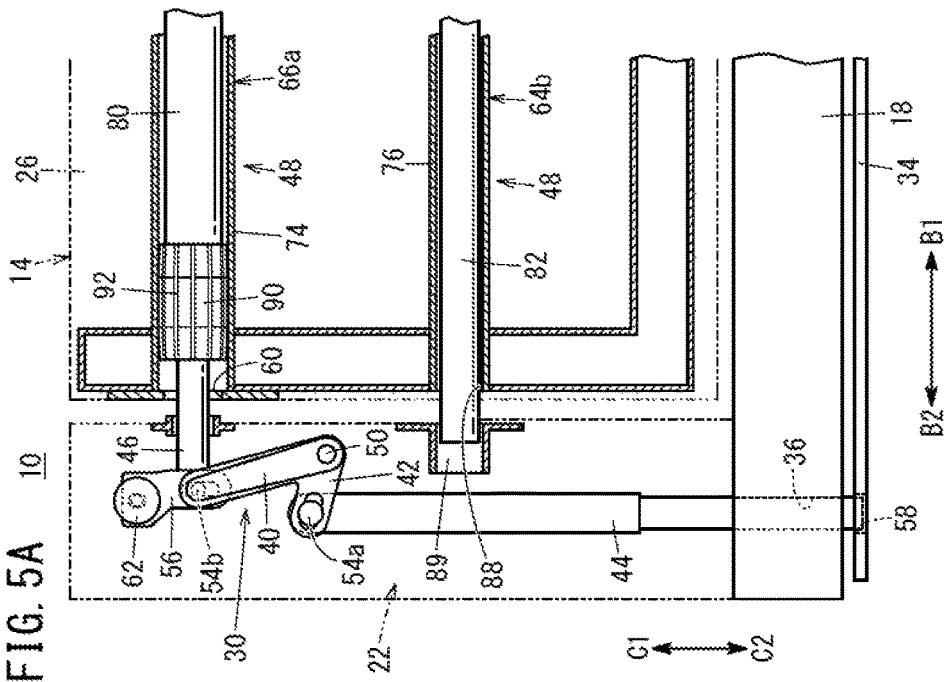

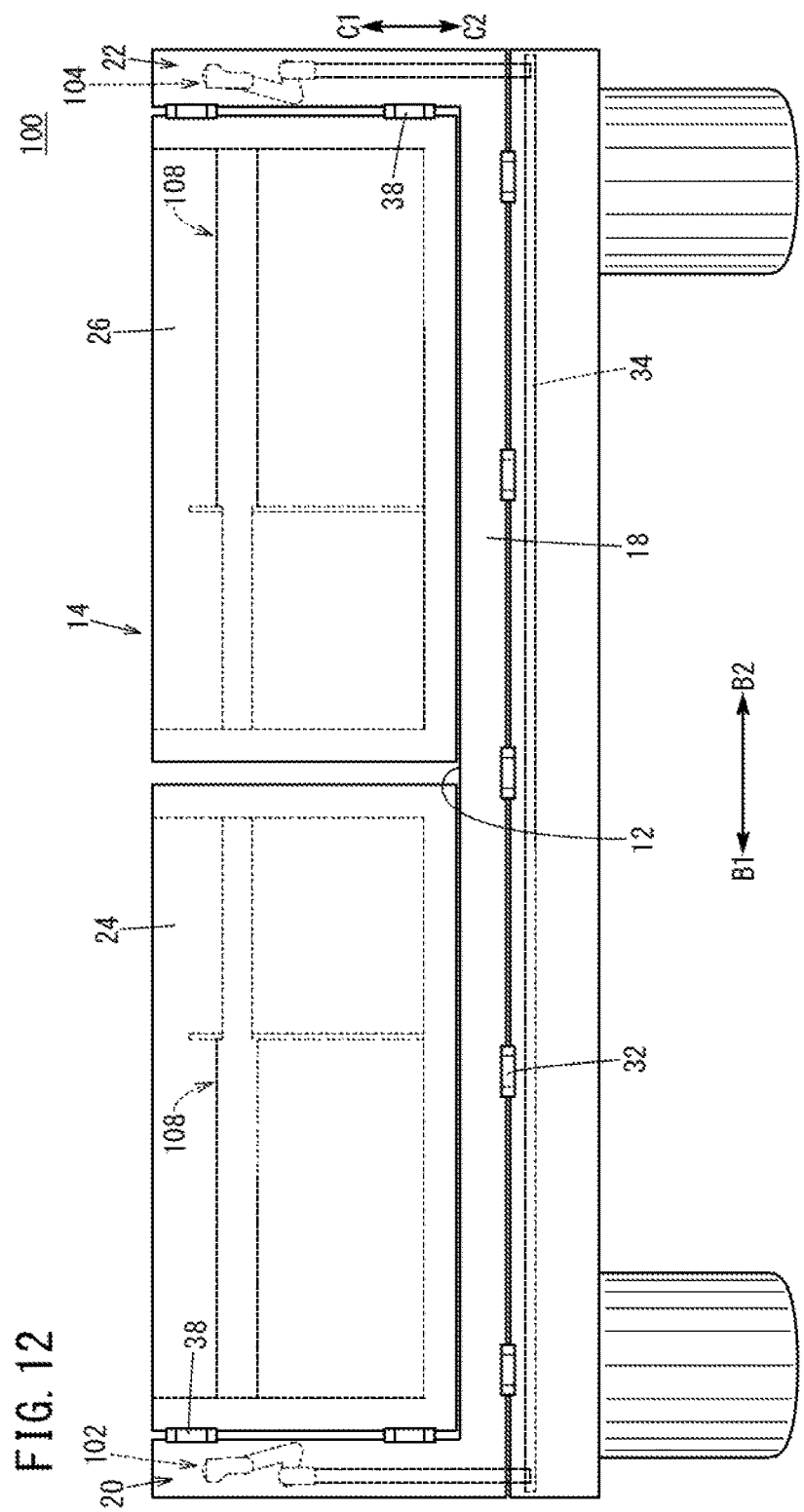

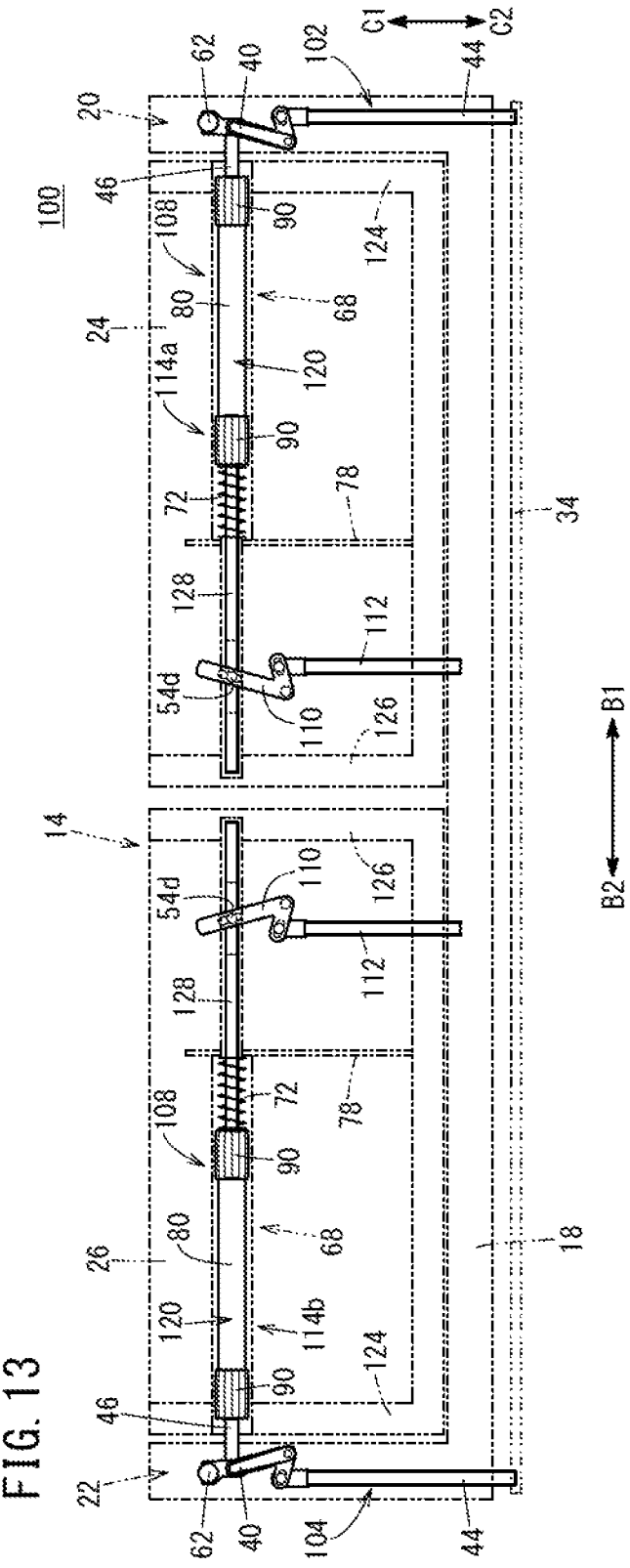

CARGO BED GATE OPENING/CLOSING MECHANISM OF TRUCK

CROSS-REFERENCE TO RELATED APPLICATIONS

This application is based upon and claims the benefit of priority from Japanese Patent Applications No. 2016-191019 filed on Sep. 29, 2016, and No. 2016-254904 filed on Dec. 28, 2016, the contents all of which are incorporated herein by reference.

BACKGROUND OF THE INVENTION

Field of the Invention

The present invention relates to a cargo bed gate opening/closing mechanism of a truck that opens and closes a cargo bed gate arranged at a rear end of a cargo bed of a truck.

Description of the Related Art

Conventionally, a cargo bed gate opening/closing mechanism of a truck having a cargo bed (truck bed) at a vehicle rear portion is known, and the mechanism switches an opened/closed state of a gate openably arranged at a rear end of this cargo bed.

For example, a cargo bed gate opening/closing mechanism disclosed in Japanese Laid-Open Utility Model Publication No. 01-148937 includes a rear gate rotatably arranged at a rear portion of a cargo bed, and a tail gate at an upper portion of the rear gate. This tail gate includes a pair of a left gate and a right gate that are turnable from gate frames arranged on both sides in a vehicle width direction. A gate lock mechanism is arranged across the left and right gates. The gate lock mechanism integrally couples the left gate and the right gate, and integrally locks the rear gate and the tail gate.

A first tail gate lock mechanism is able to lock the left gate, the right gate, and the gate frames. A second tail gate lock mechanism is able to lock the left gate and the right gate. A third tail gate lock mechanism is able to lock the left gate, the right gate, and the cargo bed. A rear gate lock mechanism is able to lock the rear gate and the cargo bed.

For example, by locking the first and second tail gate lock mechanisms, unlocking the third tail gate lock mechanism, and unlocking the gate lock mechanism, it is possible to turn the tail gate toward a rear side of the cargo bed and vertically open the tail gate.

Meanwhile, by unlocking the first and second tail gate lock mechanisms, locking the third tail gate lock mechanism and the rear gate lock mechanism, and unlocking the gate lock mechanism, it is possible to horizontally open the left gate and the right gate of the tail gate to the left and the right with respect to the gate frames.

SUMMARY OF THE INVENTION

However, the above cargo bed gate opening/closing mechanism includes a plurality of lock mechanisms that restrict a tail gate, a rear gate, a left gate, and a right gate from opening and closing. Therefore, when each gate is switched between vertical opening and horizontal opening, at least two or more lock mechanisms need to be operated. Hence, it is concerned that an operation of switching an opened/closed state of each gate becomes very complicated, and that an erroneous operation is performed. Providing the plurality of lock mechanisms increases the weight and manufacturing cost of the plurality of lock mechanisms.

There is a case where, depending usage of the cargo bed, only one of a left gate and a right gate is desired to be selectively opened horizontally to load/unload onto/from the cargo bed. However, it is impossible to place only one of the left gate and the right gate in an opened state (closed state). Therefore, it is necessary to horizontally open both of the left gate and the right gate in this case.

A general object of the present invention is to provide a cargo bed gate opening/closing mechanism of a truck that can easily and reliably switch between vertical opening and horizontal opening of a gate of a cargo bed with a simple configuration.

The present invention is a cargo bed gate opening/closing mechanism of a truck configured to switch an opened/closed state of a cargo bed gate of the truck, the truck including the cargo bed gate openably provided at a rear end of a cargo bed, wherein the cargo bed gate is surrounded by a support frame member in a vehicle width direction and on a vehicle lower side, and the cargo bed gate is divided into two in the vehicle width direction, and includes a first rod housed inside and extending in the vehicle width direction, wherein the support frame member includes a first frame portion configured to support an end of the cargo bed gate in the vehicle width direction, and a second frame portion configured to support a lower portion of the cargo bed gate, and the first frame portion includes a second rod housed inside, the second rod penetrating the second frame portion and provided movably toward a vehicle main body, and wherein the cargo bed gate is configured to perform an opening operation pivotally around a side of the second frame portion when the first rod is inserted inside the first frame portion, and the second rod retreats from the second frame portion, and is configured to enable divided portions to perform an opening operation when the first rod retreats from the first frame portion and the second rod moves toward the vehicle main body.

According to the present invention, the cargo bed gate openably arranged at the rear end of the cargo bed is surrounded by first and second frame portions of a support frame member in the vehicle width direction and on the vehicle lower side, and the cargo bed gate is divided into two in the vehicle width direction, and includes the first rod housed inside and extending in the vehicle width direction. The first frame portion includes the second rod housed inside, and the second rod penetrates the second frame portion and is provided movably toward the vehicle main body. The cargo bed gate can be vertically opened pivotally around a side of the second frame portion when the first rod is inserted inside the first frame portion, and the second rod retreats from the second frame portion. Meanwhile, divided portions can be horizontally opened when the first rod retreats from the first frame portion and the second rod moves toward the vehicle main body.

Consequently, compared to a cargo bed gate opening/closing mechanism according to a conventional technique that switches between vertical opening and horizontal opening of the cargo bed gate by a plurality of lock mechanisms, it is possible to easily and reliably switch an opened/closed state of the cargo bed gate by causing the first and second rods to perform an advancing/retreating operation. Further, compared to the cargo bed gate opening/closing mechanism according to the conventional technique, it is possible to reduce the number of parts by employing a simple configuration, and consequently reduce manufacturing cost and reduce the weight of the cargo bed gate opening/closing mechanism.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5A is an enlarged cross-sectional view of the second opening/closing switching unit showing a state where the rear gate is locked from both vertically opening and horizontally opening;

FIG. 5B is an enlarged cross-sectional view of the first opening/switching unit showing a locked state in FIG. 5A;

FIG. 12 is a rear view of the truck to which the cargo bed gate opening/closing mechanism according to a second embodiment of the present invention is applied;

FIG. 13 is a front view showing the opening/closing switching units housed inside the rear gate in FIG. 12 from the cargo bed side;

DESCRIPTION OF THE PREFERRED EMBODIMENTS

Figure 1:
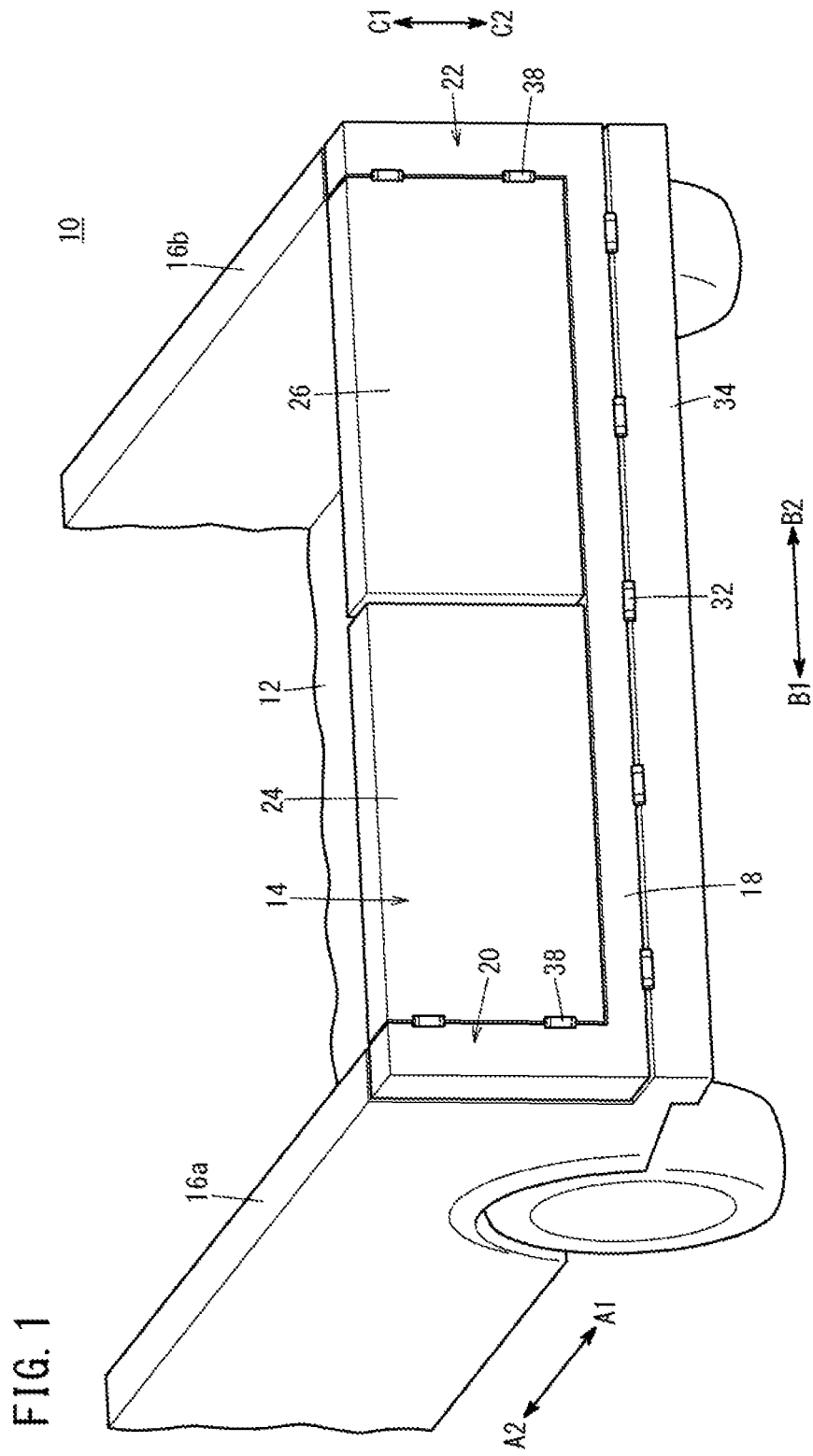
FIG. 1 is an external appearance perspective view showing a proximity of a rear end of a truck to which a cargo bed gate opening/closing mechanism according to a first embodiment of the present invention is applied.

As illustrated in FIG. 1, a truck 10 includes a cargo bed (truck bed, also simply referred to "bed") 12 that horizontally and flatly extends toward a vehicle rear side (arrow A1 direction) of a driver's seat that is not shown, a rear gate (cargo bed gate, tail gate) 14 that is openable toward a rear side (arrow A1 direction) at a rear end portion of the bed 12, and a pair of side gates 16a, 16b in a vehicle width direction (directions of arrows B1, B2) of the bed 12.

Figure 2:
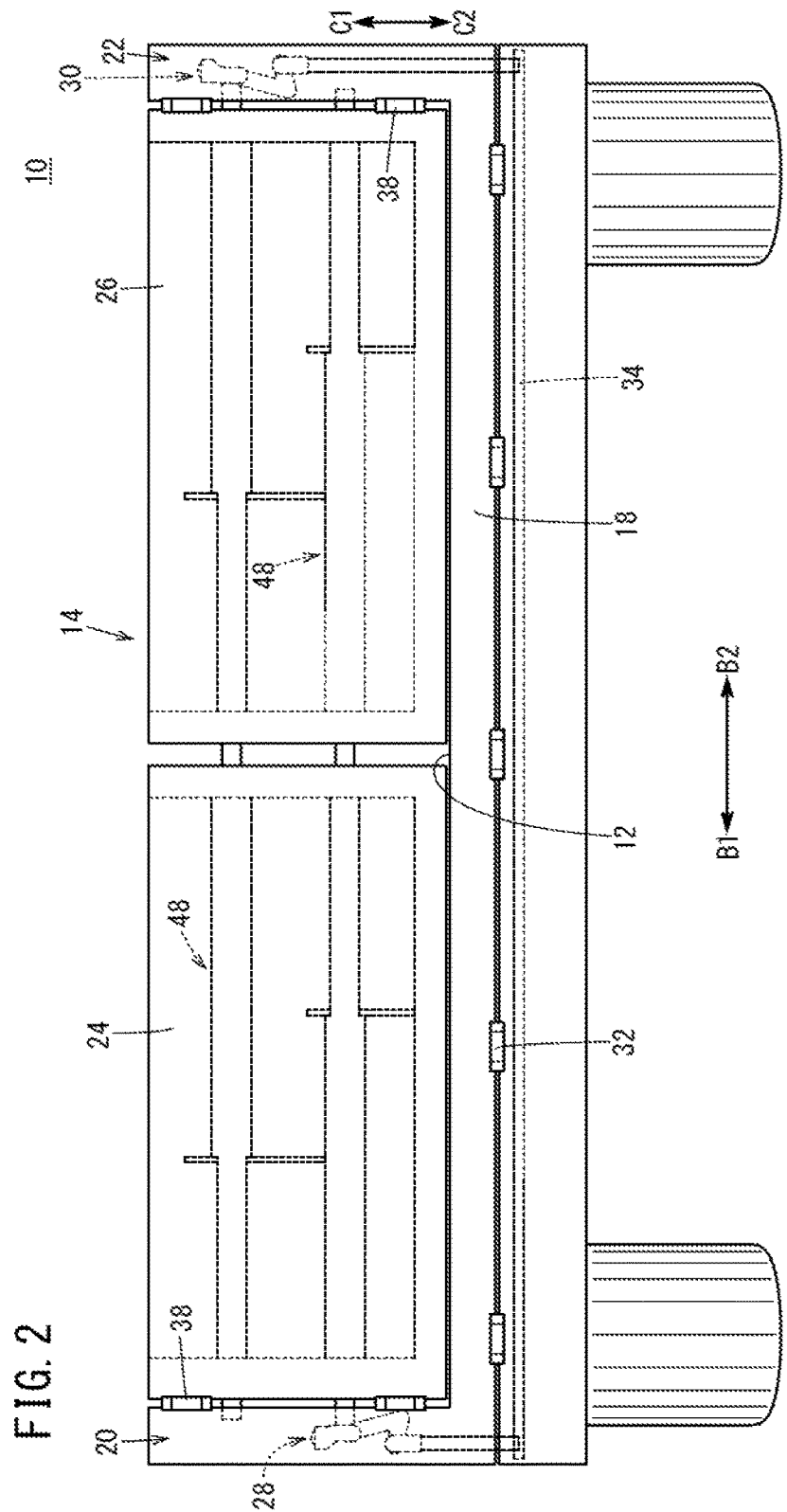
FIG. 2 is a rear view of a rear portion of the truck shown in FIG. 1 from a vehicle rear side.

As shown in FIGS. 1 and 2, this rear gate 14 includes, for example, a support frame (second frame portion) 18 that is arranged substantially parallel to the bed 12, and extends in the vehicle width direction (directions of arrows B1, B2), a pair of first and second gate frame bodies (first frame portions) 20, 22 that are arranged at both ends in the vehicle width direction of the support frame 18, a first divided gate 24 and a second divided gate 26 that are supported openably from the first and second gate frame bodies 20, 22, respectively, and a pair of first and second opening/closing switching units (cargo bed gate opening/closing mechanism) 28, 30 that can switch an opened/closed state of the rear gate 14 including the first and second divided gates 24, 26.

As shown in FIGS. 1 to 7, the support frame 18 is formed in, for example, a rectangular cross-sectional shape, arranged above (arrow C1 direction) a rear end upper surface of the bed 12, and supported turnably by a predetermined angle (e.g., approximately 90°) toward a rear side (arrow A1 direction) of the bed 12 by a plurality of first hinges 32.

These first hinges 32 are arranged to connect, for example, the rear end upper surface of the bed 12 and a lower surface of the support frame 18, and are arranged at predetermined intervals apart from each other along a longitudinal direction (directions of arrows B1, B2) of the support frame 18.

A vehicle body frame (vehicle main body) 34 that forms a vehicle body of the truck 10 is arranged below (arrow C2 direction) of this support frame 18, and extends along a horizontal direction substantially parallel to the support frame 18.

When the support frame 18 turns toward the rear side (arrow A1 direction) of the bed 12, for example, the support frame 18 turns toward a vehicle rear side by approximately 90° at which the first hinges 32 are at a right angle, and is restricted and held.

Figure 4:
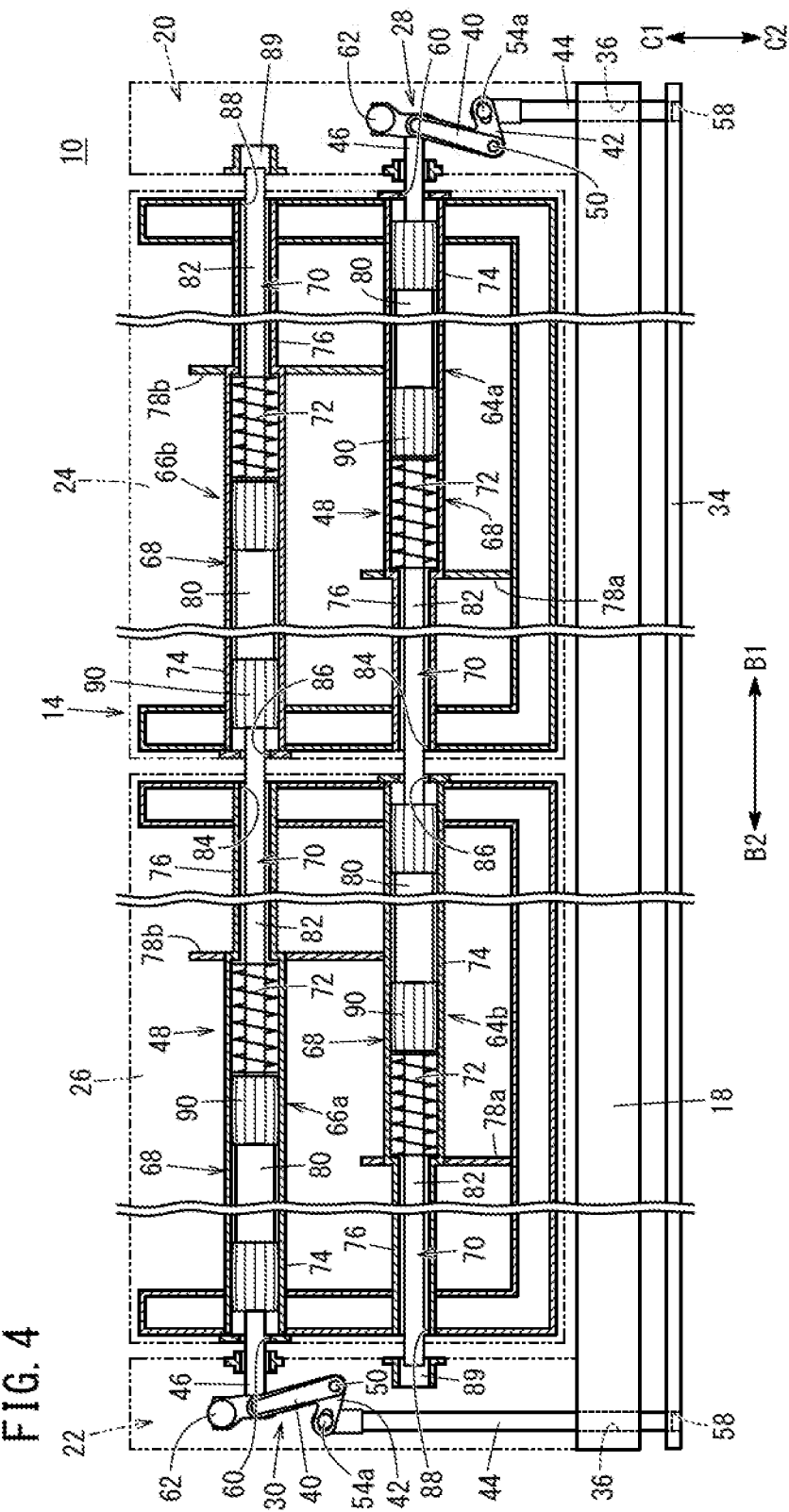
FIG. 4 is an entire cross-sectional view of the first and second opening/closing units shown in FIG. 3, with partial omission.

As shown in FIG. 4, pin holes 36 are formed at positions that are end portions of the support frame 18 in the width direction, penetrate in a vertical direction (directions of arrows C1, C2), and allow first lock pins (second rods) 44 of the first and second opening/closing switching units 28, 30 described below to be inserted therein.

As shown in FIGS. 1 to 7, the first and second gate frame bodies 20, 22 are formed hollow in rectangular cross-sectional shapes, for example, are arranged upright at both end portions along a width direction (directions of arrows B1, B2) of the support frame 18, and are formed at the substantially same height as and facing toward rear ends of the side gates 16a, 16b of the bed 12. That is, the first and second gate frame bodies 20, 22 extend in the vertical direction (directions of arrows C1, C2) perpendicular to forward and backward directions (directions of arrows A1, A2 in FIG. 1) of the vehicle.

Figure 8:
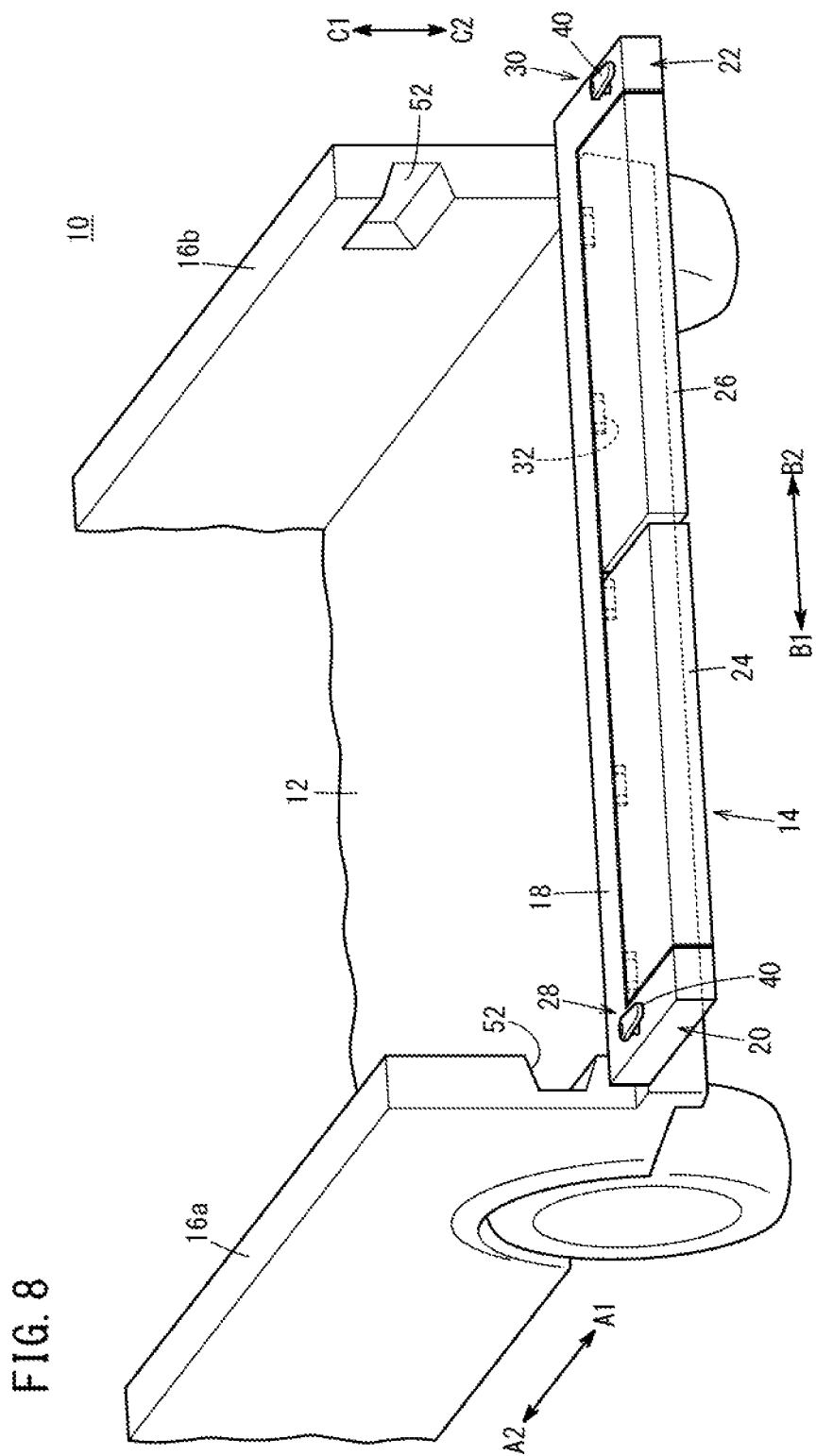
FIG. 8 is an external appearance perspective view showing the proximity of the rear end of the truck showing a state of the rear gate vertically opened from the cargo bed shown in FIG. 1.

The first and second gate frame bodies 20, 22 form a frame body (support frame member) of a U cross-sectional shape with lower end portions integrally jointed to the support frame 18. As shown in FIG. 8, the first and second gate frame bodies 20, 22 are arranged turnably by a predetermined angle toward the rear side (arrow A1 direction) of the bed 12 (vehicle body frame 34) together with the support frame 18.

The first and second gate frame bodies 20, 22 may be formed separately from the support frame 18.

The first and second divided gates 24, 26 are arranged, for example, at an upper portion of the support frame 18 and between the first gate frame body 20 and the second gate frame body 22, and are divided into two at a width direction center of the vehicle. Upper portions of the first and second divided gates 24, 26 are formed at the substantially same height as the first and second gate frame bodies 20, 22.

This first divided gate 24 is arranged at, for example, one side (arrow B1 direction) in the vehicle width direction, and includes a vehicle width direction end portion supported by second hinges 38 openably from the sidewall of the first gate frame body 20. Meanwhile, the second divided gate 26 is arranged at, for example, another side (arrow B2 direction) in the vehicle width direction, and includes a width end portion supported by the second hinges 38 openably from a sidewall of the second gate frame body 22.

Figure 9:
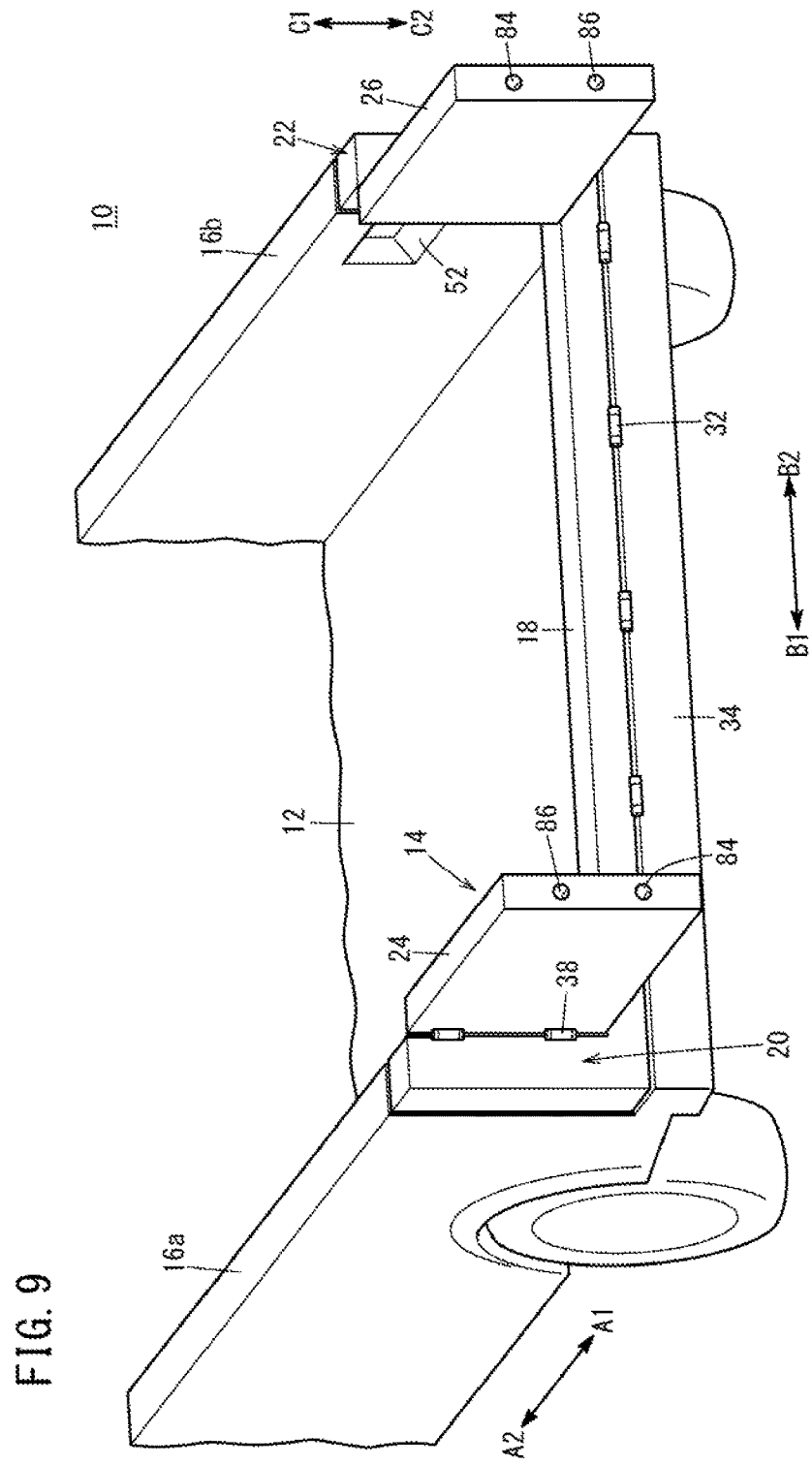
FIG. 9 is an external appearance perspective view of the proximity of the rear end of the truck showing a state of first and second divided gates of the rear gate horizontally opened from the cargo bed shown in FIG. 1.

The plurality of second hinges 38 are arranged along a height direction (directions of arrows C1, C2) of the first and second divided gates 24, 26. As shown in FIG. 9, the first divided gate 24 and the second divided gate 26 are pivotal around the first and second gate frame bodies 20, 22 supported by the second hinges 38, and are supported turnably outwardly such that the respective portions near the width direction center move away from the bed 12.

As shown in FIGS. 3 to 5B, the first and second opening/closing switching units 28, 30 include, for example, operation levers (operation units) 40 that are operated by an operator who is not shown, link arms 42 that are coupled to the operation levers 40, the first lock pins 44 that are supported by the link arms 42 and perform an advancing/retreating operation in the vertical direction (directions of arrows C1, C2), second lock pins (pistons) 46 that are supported by the link arms 42 and perform an advancing/retreating operation in the horizontal direction (directions of arrows B1, B2), and rod mechanisms (first rods) 48 that are housed in the first and second divided gates 24, 26.

This first opening/closing switching unit 28 is arranged on a side of the first gate frame body 20 (arrow B1 direction) and on a lower side near the support frame 18 (arrow C2 direction). The second opening/closing switching unit 30 is arranged on a side of the second gate frame body 22 (arrow B2 direction) and on an upper side (arrow C1 direction) of the first opening/closing switching unit 28.

That is, the first and second opening/closing switching units 28, 30 are offset and arranged in upper and lower directions (directions of arrows C1, C2) of the first and second gate frame bodies 20, 22, respectively.

The operation levers 40, the link arms 42 and the first and second lock pins 44, 46 are arranged in the first and second gate frame bodies 20, 22, respectively, and the rod mechanisms 48 are housed inside the first and second divided gates 24, 26.

As shown in FIG. 8, the operation levers 40 have predetermined lengths, and are arranged on outer sides of the first and second gate frame bodies 20, 22, and facing toward a side of the bed 12 (arrow A2 direction) that is a vehicle front side. Support shafts 50 are coupled to one end portions of the operation levers 40, and the operation levers 40 are supported turnably with respect to the first and second gate frame bodies 20, 22. The operator who is not shown grips the other end portion sides of the operation levers 40 to turn around the support shafts 50.

Figure 10A:
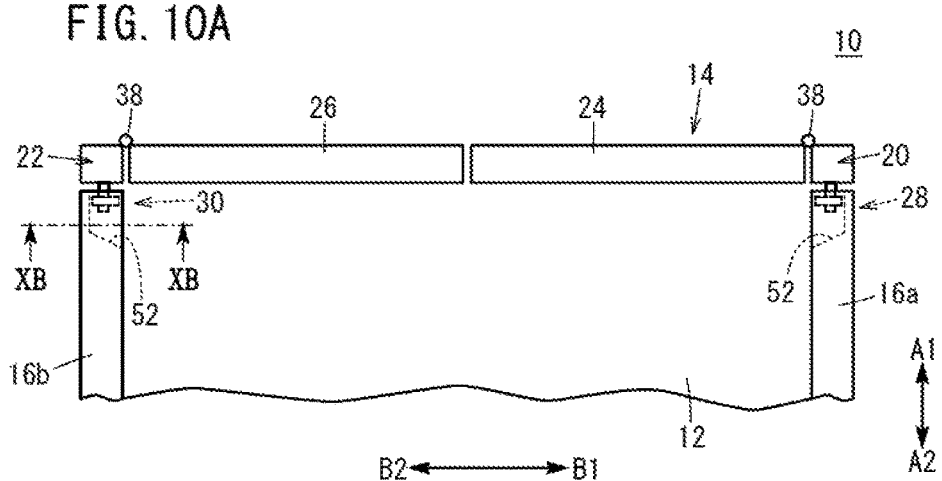
FIG. 10A is a plan view of a proximity of a rear end of a cargo bed, with partial omission.
Figure 10B:
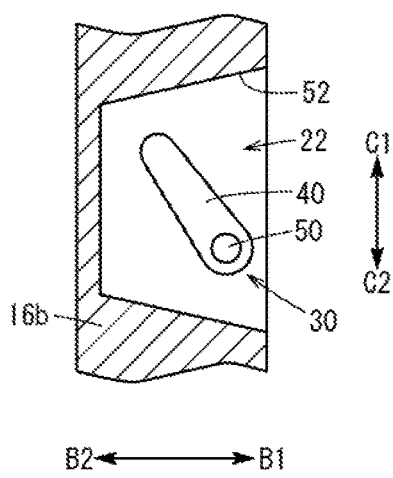
FIG. 10B is a cross-sectional view along a line XB-XB in FIG. 10A.

As shown in FIGS. 8, 10A and 10B, the operation levers 40 are arranged facing toward rear end portions of the pair of side gates 16a, 16b and are formed on inner wall surfaces of these side gates 16a, 16b. The operation levers 40 can be housed and arranged in a pair of recess portions 52 that are recessed outwardly in a vehicle width direction (directions of arrows B1, B2) and toward a vehicle front side (arrow A2 direction). In other words, cutouts are formed near rear end portions of the side gates 16a, 16b and at positions facing toward the operation levers 40.

Consequently, even in a state where the rear gate 14 including the first and second divided gates 24, 26 is locked and is fixed to cover the rear end portions of the side gates 16a, 16b, the operation levers 40 are not covered by the side gates 16a, 16b and can be exposed via the recess portions 52. Consequently, the operator who is not shown can reliably operate the operation levers 40 via the recess portions 52.

As shown in FIGS. 4 to 7, the link arms 42 are formed in, for example, substantially an L cross-sectional shape, are housed in the first and second gate frame bodies 20, 22 and include center portions coupled to the support shafts 50 coupled with the operation levers 40. The link arms 42 include one end portions that pivotally support the first lock pins 44 via link pins 54a, and other end portions that engage with plates 56 coupled with the second lock pins 46 via link pins 54b.

The link arms 42 integrally turn pivotally around the support shafts 50 by operating the operation levers 40, and along with the turning action, the first and second lock pins 44, 46 supported at the one end portions and the other end portions of the link arms 42 perform an advancing/retreating operation.

The first lock pins 44 are formed by shafts formed to have substantially fixed diameters, are arranged extending in the vertical direction (directions of arrows C1, C2), and include upper end portions pivotally supported turnably with respect to the link arms 42 and other end portions (arrow C2 direction) inserted in the pin holes 36 of the support frame 18. At positions below the pin holes 36, lock holes 58 are formed in the vehicle body frame 34. The first lock pins 44 are arranged movably forward and backward along the pin holes 36 in the vertical direction (directions of arrows C1, C2) under turning actions of the link arms 42.

Similar to the first lock pins 44, the second lock pins 46 are formed by shafts formed to have substantially fixed diameters, are arranged extending in the horizontal direction (directions of arrows B1, B2), and include one end portions coupled to the plates 56 engaged with the link arms 42 and other end portions that axe insertably arranged in first gate holes 60 opened in the sidewalls of the first and second divided gates 24, 26 facing toward the first and second gate frame bodies 20, 22.

The second lock pins 46 perform an advancing/retreating operation along the horizontal direction (directions of arrows B1, B2) under turning actions of the link arms 42, and are arranged to approach and move away from the first and second divided gates 24, 26.

More specifically, the second lock pin 46 of the first opening/closing switching unit 28 is arranged insertably in the first gate hole 60 of the first divided gate 24. The second lock pin 46 of the second opening/closing switching unit 30 is arranged insertably in the first gate hole 60 of the second divided gate 26.

A lock unit 62 is arranged facing toward a side portion of the plate 56, restricts movement in the horizontal direction (arrow B1, B2 direction) of the plate 56 and enables movement of the plate 56 by releasing a restricted state.

As shown in FIGS. 3 to 5B, the rod mechanisms 48 include a pair of first rod bodies 64a, 64b that form the first opening/closing switching unit 28 and are respectively housed in the first and second divided gates 24, 26, and a pair of second rod bodies 66a, 66b that form the second opening/closing switching unit 30 and are respectively housed at upper portions of the first rod bodies 64a, 64b of the first and second divided gates 24, 26. The first rod bodies 64a, 64b and the second rod bodies 66a, 66b are arranged in the substantially horizontal direction (directions of arrows B1, B2) inside the first and second divided gates 24, 26, and in the vertical direction (directions of arrows C1, C2) at predetermined intervals apart from each other in parallel.

Each of the first rod bodies 64a, 64b and the second rod bodies 66a, 66b is formed in the substantially same shape, and is formed by a cylindrical body (body) 68 that is formed in a hollow shape, a movable body 70 that is movably arranged inside the cylindrical body 68, and a spring 72 that is interposed between this movable body 70 and the cylindrical body 68.

This cylindrical body 68 includes a large diameter portion 74 that is formed at one end portion side of this cylindrical body 68, and a small diameter portion 76 that is formed at another end portion side and whose diameter is reduced compared to the large diameter portion 74. The one end portion and the other end portion are respectively fixed to sidewalls of each of the first and second divided gates 24, 26. The sidewalls are positioned around both end portions (width direction end portions) and the center (width direction center portions) of the vehicle width. First and second gate holes 60, 86 opened in the sidewalls, and first and second rod holes 84, 88 and an interior of the cylindrical body 68 are connected to each other.

The large diameter portions 74 of the first rod bodies 64a, 64b are arranged on a side of the first gate frame body 20 (arrow B1 direction), and the large diameter portions 74 of the second rod bodies 66a, 66b are arranged on a side of the second gate frame body 22 (arrow B2 direction). In more detail, the large diameter portion 74 of the one first rod body 64a is fixed to the width direction end portion of the first divided gate 24 facing toward the first gate hole 60. The large diameter portion 74 of the other first rod body 64b is fixed to the width direction center portion of the second divided gate 26 facing toward the second gate hole 86.

The large diameter portion 74 of the one second rod body 66a is fixed to the width direction end portion of the second divided gate 26 facing toward the first gate hole 60. The large diameter portion 74 of the other second rod body 66b is fixed to the width direction center portion of the first divided gate 24 facing toward the second gate hole 86.

That is, in the first and second divided gates 24, 26, the first rod bodies 64a, 64b and the second rod bodies 66a, 66b are arranged alternately in the width direction (directions of arrows B1, B2).

Figure 3:
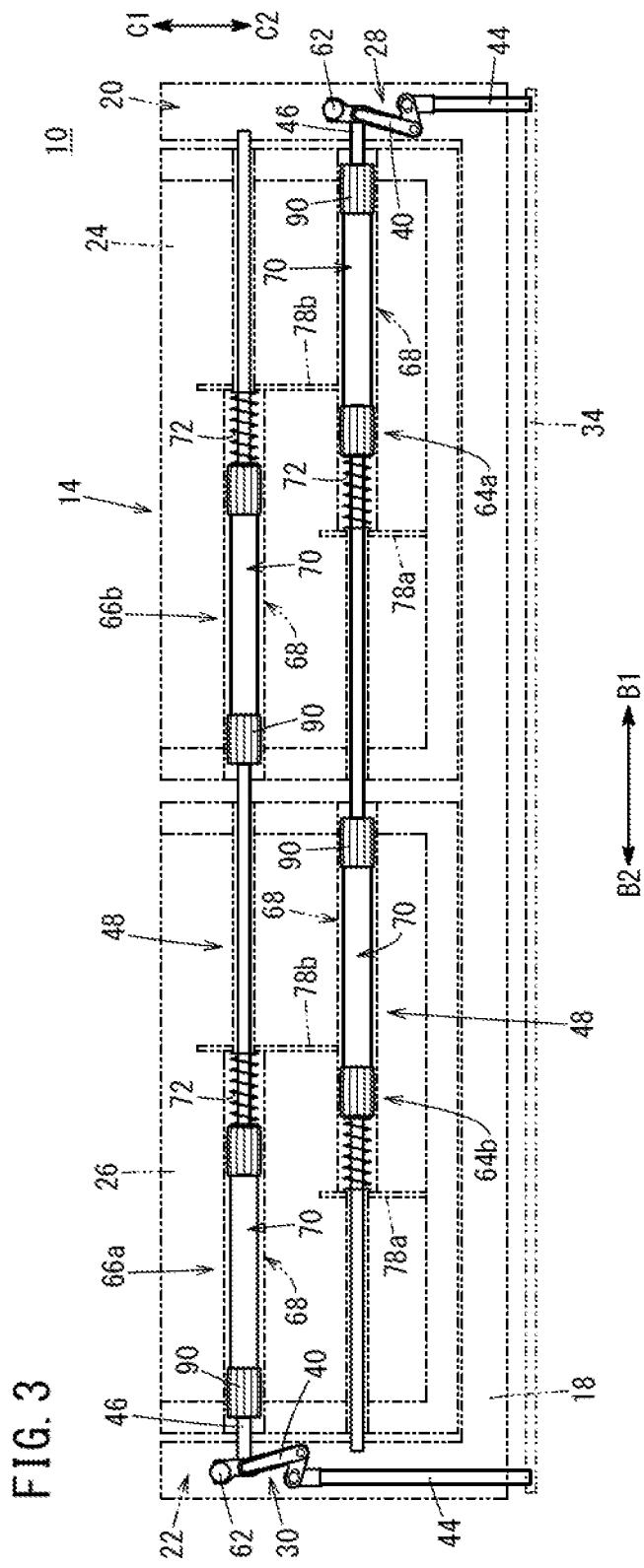
FIG. 3 is a front view showing first and second opening/closing switching units housed inside a rear gate in FIG. 2 from a cargo bed side.

As shown in FIGS. 3 and 4, each cylindrical body 68 includes support plates 78a, 78b at a boundary position between the large diameter portion 74 and the small diameter portion 76.

These support plates 78a, 78b extend downward (arrow C2 direction) substantially perpendicular to an axial line of the cylindrical body 68. When, for example, lower ends of the support plates 78a provided to the first rod bodies 64a, 64b come into contact with inner wall portions of the first and second divided gates 24, 26, the support plates 78a, 78b are retained. When lower ends of the support plates 78b provided to the second rod bodies 66a, 66b come into contact with the first rod bodies 64a, 64b, the support plates 78a, 78b are retained. Thus, the support plates 78a, 78b suitably prevent downward deflection of the first rod bodies 64a, 64b and the second rod bodies 66a, 66b.

The movable body 70 is formed by a thick shaft portion 80 that is formed at one end portion side of the movable body 70 and that is housed in the large diameter portion 74 of the cylindrical body 68, and a thin shaft portion 82 that is formed at another end portion side and that has a smaller diameter than the thick shaft portion 80. The spring 72 is interposed between a boundary surface between the large diameter portion 74 and the small diameter portion 76 in the cylindrical body 68, and an end portion of the thick shaft portion 80. Resilient forces of these springs 72 are biased to press the thick shaft portions 80 toward one end portion sides of the cylindrical bodies 68, and end portions of the thick shaft portions 80 come into contact with the first and second divided gates 24, 26 to which the cylindrical bodies 68 are fixed.

The movable body 70 of the first rod body 64a housed in the first divided gate 24 is arranged such that the thick shaft portion 80 faces toward the first gate hole 60 and the thin shaft portion 82 faces toward the first rod hole 84 opened at the width direction center. The movable body 70 of the first rod body 64b housed in the second divided gate 26 is arranged such that the thick shaft portion 80 faces toward the second gate hole 86 opened at the width direction center and the thin shaft portion 82 faces toward the second rod hole 88 opened at the width direction end portion.

The movable body 70 of the second rod body 66a housed in the second divided gate 26 is arranged such that the thick shaft portion 80 faces toward the first gate hole 60 and the thin shaft portion 82 faces toward the first rod hole 84 opened at the width direction center. The movable body 70 of the second rod body 66b housed in the first divided gate 24 is arranged such that the thick shaft portion 80 faces toward the second gate hole 86 opened at the width direction center and the thin shaft portion 82 faces toward the second rod hole 88 opened at the width direction end portion.

When the second lock pin 46 presses the one movable body 70 in an axial direction, the thin shaft portion 82 is inserted from the first rod hole 84 to the neighboring second gate hole 86. When the inserted thin shaft portion 82 presses and moves the other movable body 70, the thin shaft portion 82 is inserted in a hole portion 89 of each of the first and second gate frame bodies 20, 22 via the second rod hole 88.

As shown in FIGS. 3 to 7, collar members 90 are arranged at the one end portion and another end portion of the thick shaft portion 80 to cover an outer circumferential surface of the thick shaft portion 80. Outer circumferential surface of the collar members 90 are in contact with an inner circumferential surface of the cylindrical body 68. Slits 92 are arranged on the outer circumferential surfaces and recessed inwardly in a radial direction. The plurality of slits 92 are formed at predetermined intervals apart from each other in a circumferential direction of the collar member 90, and are formed extending along the axial direction.

When the movable body 70 moves in the axial direction (directions of arrows B1, B2) along the large diameter portion 74 of the cylindrical body 68, the collar members 90 slide on the movable body 70 to guide, and the collar members 90 including the slits 92 reduce a sliding friction.

The cargo bed gate opening/closing mechanism of the truck 10 according to the first embodiment of the present invention is basically configured as describe above. Next, an operation, a function and effect of the cargo bed gate opening/closing mechanism will be described.

First, in a case of fixing the rear gate 14 shown in FIG. 1 to the bed 12 in a fully locked state, as shown in FIGS. 3 to 5B and 11A, the operation levers 40 of the first and second opening/closing switching units 28, 30 are at initial positions, and the link arms 42 coupled to these operation levers 40 are at predetermined positions. Thus, the first lock pins 44 are inserted in the lock holes 58 of the vehicle body frame 34 via the pin holes 36 of the support frame 18, and the support frame 18 is fixed to the vehicle body frame 34 by the first lock pins 44. As a result, the rear gate 14 including the support frame 18 is restricted from turning toward the rear side (the arrow A1 direction in FIG. 1) in a vertical opening locked state.

Simultaneously, when the link arms 42 come to the predetermined positions, the second lock pins 46 are inserted inside via the first gate holes 60 of the first and second divided gates 24, 26, and press the movable bodies 70 of the first rod body 64a and second rod body 66a toward the second and first gate frame bodies 22, 20. Thus, the movable bodies 70 slightly move in the axial direction against the resilient forces of the springs 72, and protrude toward the neighboring second divided gate 26 and first divided gate 24 via the first rod holes 84.

When the thin shaft portions 82 of the movable bodies 70 are inserted inside the neighboring second divided gate 26 and first divided gate 24 via the second gate holes 86, and press the movable bodies 70 of the first rod body 64b and second rod body 66b in the axial direction, the thin shaft portions 82 of the movable bodies 70 having moved against the resilient forces of the springs 72 protrude from the second rod holes 88, and are inserted in the hole portions 89 of the first and second gate frame bodies 20, 22.

Thus, the movable bodies 70 of the first rod bodies 64a, 64b and the second rod bodies 66a, 66b are inserted penetrating the first and second divided gates 24, 26, and inserted in the first and second gate frame bodies 20, 22, too. The second lock pins 46 are inserted in the first gate holes 60 of the first and second divided gates 24, 26.

Hence, a relative turning operation of the first and second divided gates 24, 26 is restricted, and a turning operation with respect to the first and second gate frame bodies 20, 22 is also restricted. Therefore, the first and second divided gates 24, 26 are restricted from turning in left and right directions in a horizontal opening locked state.

That is, when the operation levers 40 of the first and second opening/closing switching units 28, 30 are at the initial positions, the rear gate 14 is restricted from being vertically opened toward the vehicle rear side and being horizontally opened (like a double-leaf door) pivotally around the first and second gate frame bodies 20, 22, in the fully locked state.

Figure 6:
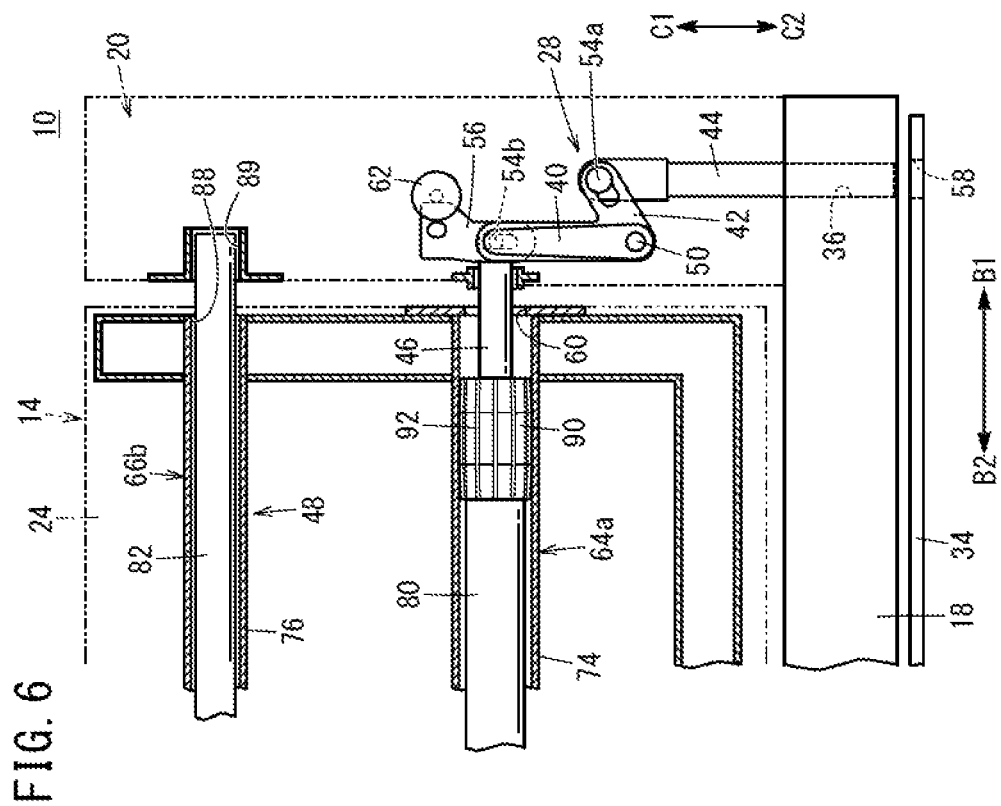
FIG. 6 is an enlarged cross-sectional view of the first opening/closing switching unit showing a state where the rear gate is locked from horizontally opening and is unlocked to vertically open.
Figure 11A:
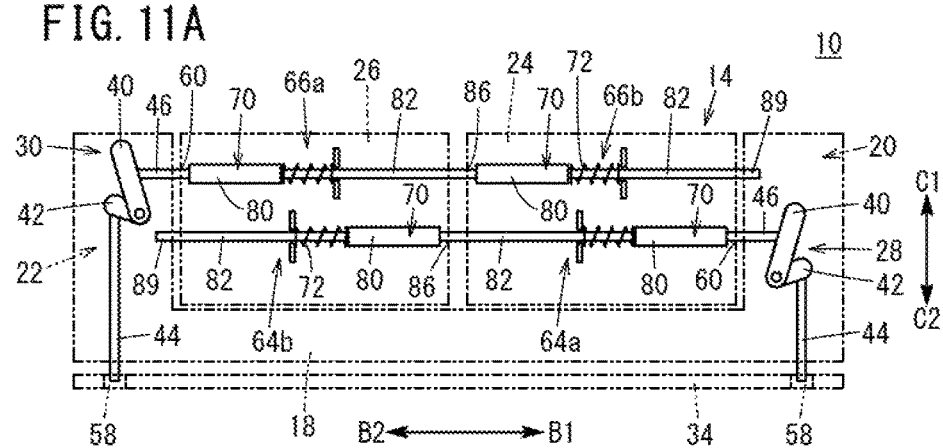
FIG. 11A is a schematic configuration front view showing a fully locked state of the rear gate shown in FIG. 1, which is fixed to the cargo bed by the first and second opening/closing switching units.
Figure 11B:
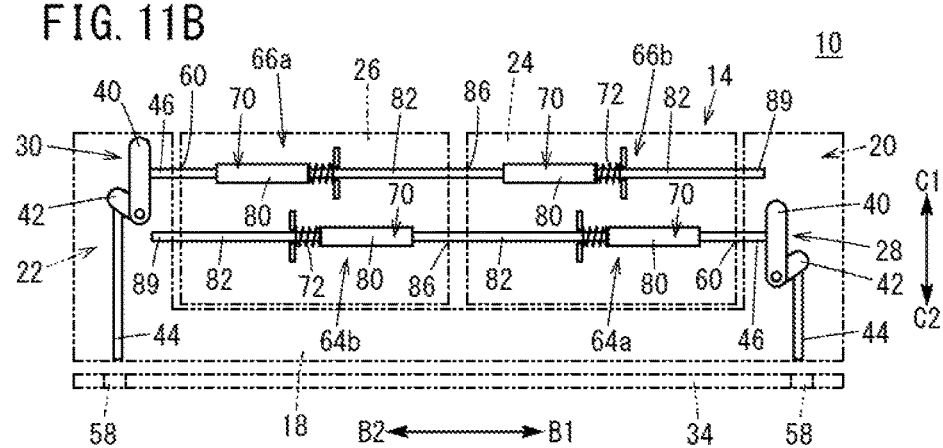
FIG. 11B is a schematic configuration front view showing a state of the rear gate vertically openable from the cargo bed.

Next, when the rear gate 14 is to be turned toward the rear side (arrow A1 direction) and to be vertically opened as shown in FIG. 8, from the fully locked state of the rear gate 14 fixed to the bed 12, as shown in FIGS. 6 and 11B, the operator who is not shown unlocks the locked state of the lock units 62, and grips the operation levers 40 at the initial positions to turn the other end portion sides by predetermined angles in directions to approach the second divided gates 24, 26, and place the operation levers 40 at vertically openable positions.

Thus, when the operation levers 40 and the link arms 42 turn together, and then the second lock pins 46 are further pushed toward the first and second divided gates 24, 26 (directions of arrows B2, B1), the one movable body 70 is pressed to move, and thereby is further inserted in the neighboring first and second divided gates 24, 26. Then, when the other movable body 70 moves and is further inserted in the hole portions 89 of the first and second gate frame bodies 20, 22, the horizontal opening locked state of the first and second divided gates 24, 26 is maintained.

Meanwhile, when the link arms 42 are turned to lift the first lock pins 44 upward (arrow C1 direction), and the lower end portions of the first lock pins 44 are removed from the lock holes 58 of the vehicle body frame 34, the support frame 18 is released from a turn restricted state with respect to the vehicle body frame 34.

As a result, as shown in FIG. 8, the rear gate 14 is vertically opened such that the support frame 18, the first and second gate frame bodies 20, 22 and the first and second divided gates 24, 26 are integrally turned toward the vehicle rear side (arrow A1 direction) via the first hinges 32. In this regard, the rear gate 14 is turned by approximately 90° by the first hinges 32 and held in a horizontal state of the rear gate 14 substantially coplanar with the bed 12.

Figure 7:
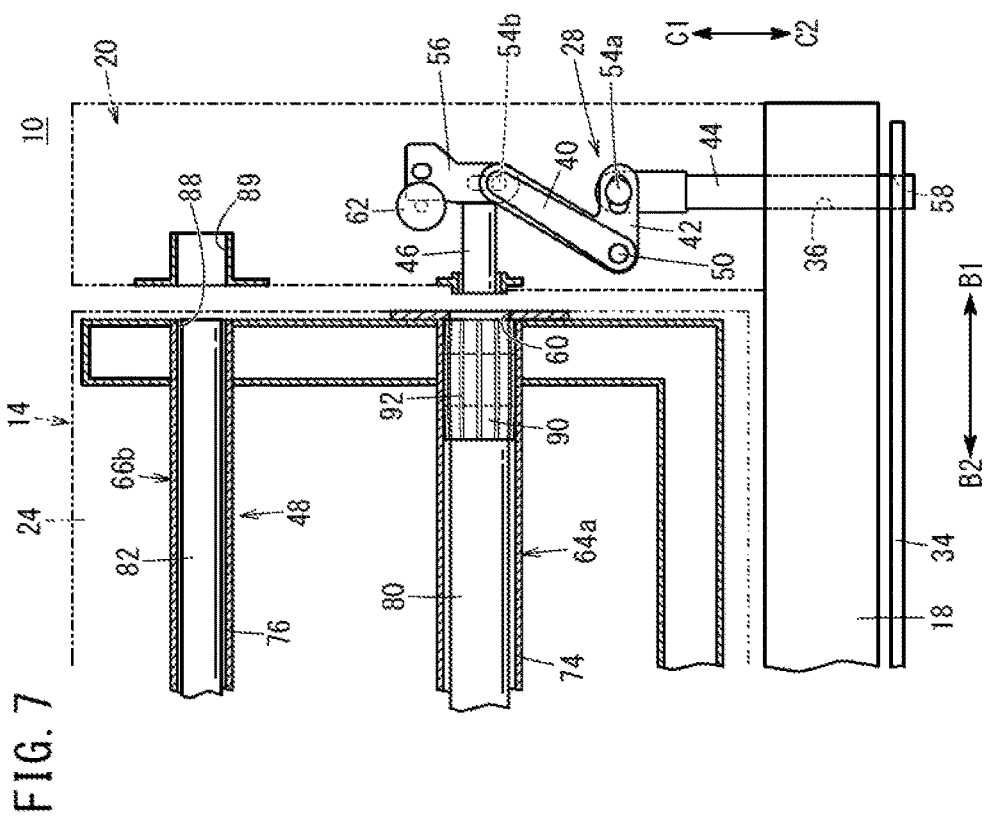
FIG. 7 is an enlarged cross-sectional view of the first opening/closing switching unit showing the state where the rear gate is locked from vertically opening and is unlocked to horizontally open.
Figure 11C:
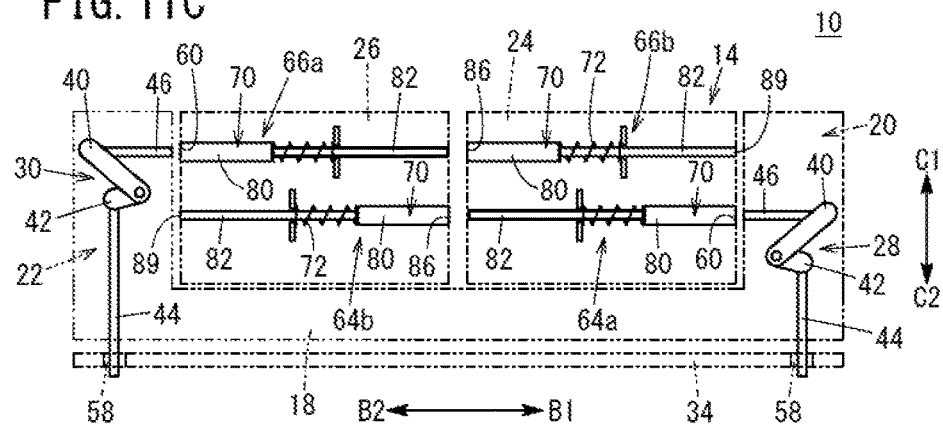
FIG. 11C is a schematic configuration front view showing a state of the rear gate horizontally openable from first and second gate frame bodies.

Lastly, when the first and second divided gates 24, 26 shown in FIG. 9 are to be turned in the left and right directions and are to be horizontally opened (like a double-leaf door) from the fully locked state of the rear gate 14 fixed to the bed 12, as shown in FIGS. 7 and 11C, the operation levers 40 at the initial positions are turned by predetermined angles in directions to move away from the first and second divided gates 24, 26, and are placed at horizontally openable positions. Thus, when the operation levers 40 and the link arms 42 turn together, and then the first lock pins 44 move downward (arrow C2 direction) and are further inserted deep in the lock holes 58 of the vehicle body frame 34, the turn restricted state of the support frame 18 with respect to the vehicle body frame 34 is maintained, and the vertically opened rear gate 14 is locked in a vertical opening locked state.

Meanwhile, turning the link arms 42 horizontally moves the second lock pins 46 in directions to move away from the first and second divided gates 24, 26, and the end portions of the second lock pins 46 are completely removed from the inside of the first and second divided gates 24, 26. Consequently, pressing forces of the first rod bodies 64a, 64b and the second rod bodies 66a, 66b against the movable bodies 70 in the axial direction are attenuated. Hence, the movable bodies 70 are moved toward the large diameter portions 74 by the resilient forces of the springs 72, and are completely housed inside the cylindrical bodies 68. That is, the thin shaft portions 82 of the movable bodies 70 that protruded from the sidewalls of the first and second divided gates 24, 26 are housed inside.

As a result, the first and second gate frame bodies 20, 22 of the first divided gate 24 and the second divided gate 26 are released from a turn restricted state of the first rod bodies 64a, 64b and the second rod bodies 66a, 66b. In a state where, as shown in FIG. 9, the support frame 18 and the first and second gate frame bodies 20, 22 are fixed to the vehicle body frame 34, the rear gate 14 is horizontally opened in the left and right directions such that the first divided gate 24 is pivotal around the width direction end portion supported by the first gate frame body 20, the second divided gate 26 is pivotal around the width direction end portion supported by the second gate frame body 22, and the width direction centers move away from each other.

Meanwhile, after the rear gate 14 is vertically opened or horizontally opened, when the rear gate 14 is to be fixed to the bed 12 and the vehicle body frame 34 again in a fully locked state as shown in FIG. 1, the width direction centers of the first and second divided gates 24, 26 are made face toward each other, the first and second gate frame bodies 20, 22 are arranged upright with respect to the bed 12 and the operation levers 40 are turned by a predetermined amount in a predetermined direction and are placed at the initial positions.

Thus, when the first lock pins 44 are inserted in the lock holes 58 of the vehicle body frame 34 via the support frame 18 under turning actions of the link arms 42, vertically opening is locked in a vertical opening locked state. When the second lock pins 46 move toward the first and second divided gates 24, 26 under turning actions of the link arms 42, and press and move the movable bodies 70 of the first rod bodies 64a, 64b and the second rod bodies 66a, 66b, the first divided gate 24 and the second divided gate 26 are coupled to each other, and are restricted from turning from the first and second gate frame bodies 20, 22 in the horizontal opening locked state. As a result, the bed 12 is locked from vertically opening toward a rear side, and horizontally opening in the left and right directions in the fully locked state.

In other words, an intermediate position between a vertically openable position at which the rear gate 14 is vertically openable, and a horizontally openable position at which the rear gate 14 is horizontally openable is an initial position of the operation levers 40 at which the rear gate 14 can be fully locked.

The above embodiment has described a case where both of the end portions in the vehicle width direction are provided with the first and second opening/closing switching units 28, 30. The embodiment is not limited to this, and at least one of opening/closing switching units may be arranged.

As described above, in the first embodiment, the rear gate 14 arranged at the rear end of the bed 12 of the truck 10 includes the first and second gate frame bodies 20, 22 that are vertically arranged at both vehicle width direction ends and openably support the first and second divided gates 24, 26 divided into two, and the first and second gate frame bodies 20, 22 include the first and second opening/closing switching units 28, 30 that can be selectively switched between vertical opening and horizontal opening of the rear gate 14.

The operation levers 40 provided to the first and second opening/closing switching units 28, 30 are operated in a predetermined direction to insert in the vehicle body frame 34 the first lock pins 44 that are movable in the vertical direction, and lock the rear gate 14 from vertically opening toward the rear side of the vehicle body frame 34. Meanwhile, the operation levers 40 are operated in an opposite direction to move the second lock pins 46 in the horizontal direction to press the rod mechanisms 48 housed in the first and second divided gates 24, 26 and make the rod mechanisms 48 penetrate therethrough to lock horizontal opening in the left and right directions. Both of vertical opening and horizontal opening can be locked under operating actions of the operation levers 40 in a fully locked state.

Consequently, compared to a cargo bed gate opening/closing mechanism according to a conventional technique of switching between vertical opening and horizontal opening of a rear gate of a truck by a plurality of lock mechanisms, a simple operation of turning the operation levers 40 of the first and second opening/closing switching units 28, 30 and causing the first lock pins 44 or the rod mechanisms 48 to perform an advancing/retreating operation can easily and reliably switch an opened/closed state of the rear gate 14 according to usability. Compared to the cargo bed gate opening/closing mechanism according to the conventional technique, it is possible to reduce the number of parts by simplifying the configuration, and thereby reduce manufacturing cost and reduce the weight of the cargo bed gate opening/closing mechanism.

The rear gate 14 includes the pair of first and second opening/closing switching units 28, 30. Consequently, it is possible to reliably and stably switch the opened/closed state of the rear gate 14, and reliably maintain a locked state by the other opening/closing switching unit even when, for example, a failure occurs in one of the opening/closing switching units.

The operation levers 40 are configured to switch all opened/closed states, and an operation position that enables vertical opening and an operation position that enables horizontal opening are different. Consequently, it is possible to prevent the vertical opening and the horizontal opening from being simultaneously performed by mistake. That is, an operation of unlocking vertical opening is configured to reliably maintain the horizontal opening locked state, and an operation of unlocking horizontal opening is configured to reliably maintain a vertical opening locked state. In other words, an operation of unlocking one of the vertical opening and the horizontal opening is configured to be able to reliably maintain a locked state of the gate that is not opened.

The first and second divided gates 24, 26 not only are horizontally opened from a substantially center portion along a width direction of the rear gate 14, but also may be configured to be dividable into two at any of portions in the width direction (directions of arrows B1, B2) and be openable.

Next, a cargo bed gate opening/closing mechanism of a truck 100 according to a second embodiment will be described with reference to FIGS. 12 to 21D. The same components as those of the cargo bed gate opening/closing mechanism of the truck 10 according to the above first embodiment will be assigned the same reference numerals, and will not be described in detail.

A cargo bed gate opening/closing mechanism of the truck 100 according to the second embodiment differs from the cargo bed gate opening/closing mechanism of the truck 10 according to the first embodiment in that the cargo bed gate opening/closing mechanism of the truck 100 includes a pair of opening/closing switching units (cargo bed gate opening/closing mechanism) 102, 104 that can horizontally open one of the first divided gate 24 and the second divided gate 26 independently.

As shown in FIGS. 12 to 15, these opening/closing switching units 102, 104 include, for example, the operation levers 40 that are operated by the operator who is not shown, first link arms 106 that are coupled to the operation levers 40, first lock pins 44 that are supported by the first link arms 106 and perform an advancing/retreating operation in the vertical direction (directions of arrows C1, C2), second lock pins 46 that are supported by the first link arms 106 and perform an advancing/retreating operation in the horizontal direction (directions of arrows B1, B2), rod mechanisms 108 that are housed in the first and second divided gates 24, 26, second link arms 110 on the rod mechanisms 108 that are arranged in the first and second divided gates 24, 26 near the center of the vehicle width, and third lock pins (third rods) 112 that are supported by the second link arms 110 and perform an advancing/retreating operation in the vertical direction (directions of arrows C1, C2).

The operation levers 40, the first link arms (link arms) 106, the first lock pins 44 and the second lock pins 46 employ the same configuration as those of the first and second opening/closing switching units 28, 30 according to the first embodiment, and are arranged in the first and second gate frame bodies 20, 22 which are the same, and therefore will not be described in detail.

Figure 14:
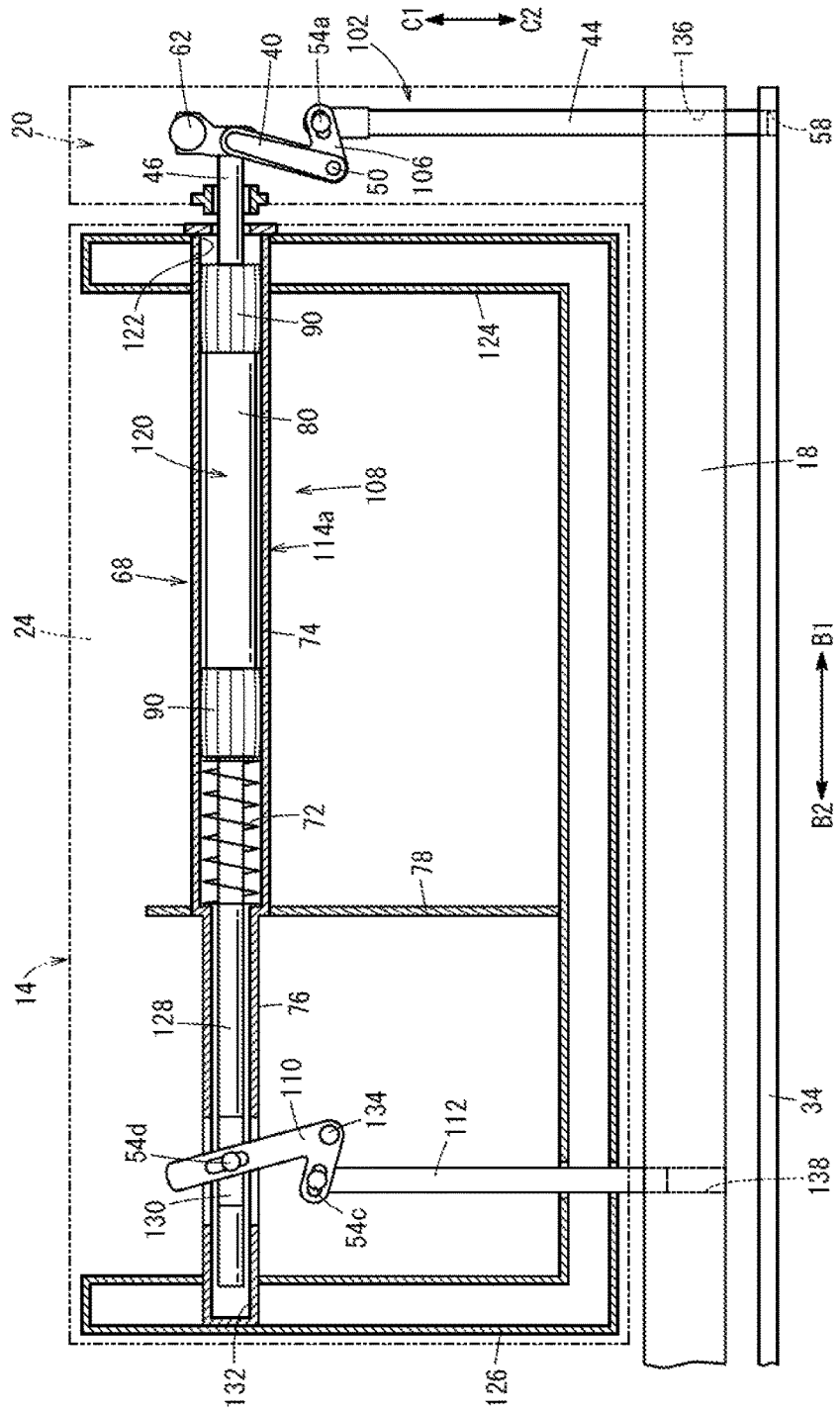
FIG. 14 is an entire cross-sectional view of the first divided gate shown in FIG. 13.
Figure 15:
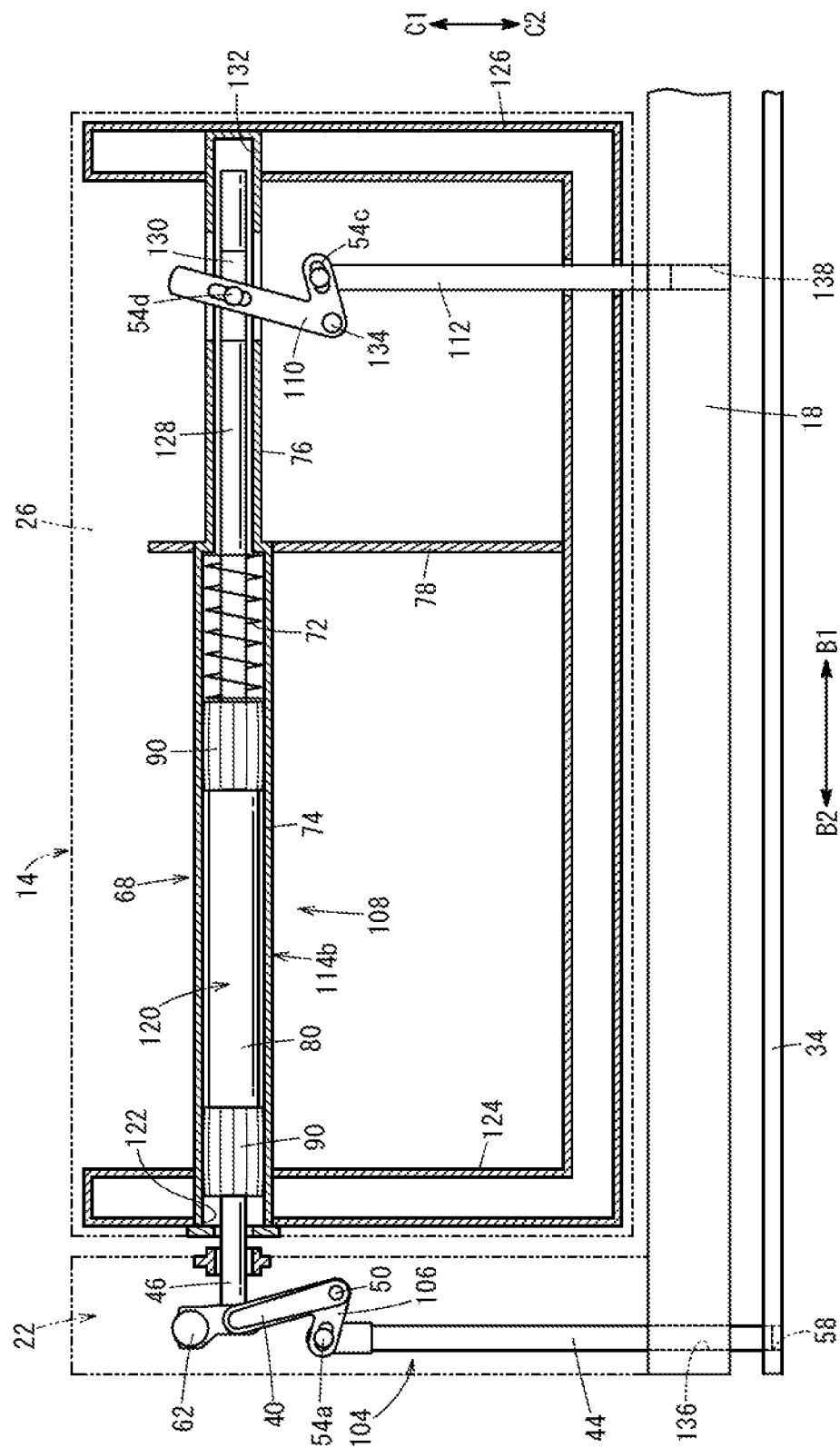
FIG. 15 is an entire cross-sectional view of the second divided gate shown in FIG. 13.

As shown in FIGS. 13 to 15, the rod mechanisms 108 include a pair of rod bodies 114a, 114b that form the opening/closing switching units 102, 104 and are housed respectively in the first and second divided gates 24, 26. The rod bodies 114a, 114b are arranged extending inside the first and second divided gates 24, 26 in the substantially horizontal direction (directions of arrows B1, B2).

As shown in FIGS. 14 and 15, these rod bodies 114a, 114b are formed by, for example, the cylindrical bodies 68 that are formed in hollow shapes, movable bodies 120 that are arranged movably inside the cylindrical bodies 68, and the springs 72 that are interposed between the movable bodies 120 and the cylindrical bodies 68.

Each cylindrical body 68 includes the large diameter portion 74 that is formed at one end portion side of the cylindrical body 68, and the small diameter portion 76 that is formed at another end portion side and whose diameter is reduced compared to the large diameter portion 74. The one end portion and the other end portion are fixed to first sidewalls 124 that are the width direction end portions of the first and second divided gates 24, 26, and a second sidewall 126 that is the width direction center. A gate hole 122 opened in the first sidewall 124, and the interior of the cylindrical body 68 are connected, and the end portion of the small diameter portion 76 is closed.

The large diameter portions 74 of the rod bodies 114a, 114b are fixed to sides of the first and second gate frame bodies 20, 22 (arrow B1 direction), and the small diameter portions 76 are fixed to the sides of the width direction center portions of the first and second divided gates 24, 26. Support plates 78 are arranged at boundary positions between the large diameter portions 74 and the small diameter portions 76 on the cylindrical bodies 68, and are fixed to and held by the inner wall portions of the first and second divided gates 24, 26.

Each movable body 120 is formed by the thick shaft portion 80 that is formed at one end portion side of the movable body 120 and is housed in the large diameter portion 74 of the cylindrical body 68, and a thin shaft portion 128 that is formed at the other end portion side and whose diameter is smaller than the thick shaft portion 80. The spring 72 is interposed between the boundary surface between the large diameter portion 74 and the small diameter portion 76 in the cylindrical body 68, and the end portion of the thick shaft portion 80. The resilient forces of this springs 72 are biased to press the thick shaft portions 80 toward the one end portions of the cylindrical bodies 68, and the end portions of the thick shaft portions 80 come into contact with the first sidewalls 124 of the first and second divided gates 24, 26 to which the cylindrical bodies 68 are fixed.

Insertion portions 130 cut out in a rectangular cross-sectional shape are formed at the thin shaft portions 128 and near end portions on sides of width direction center portions of the first and second divided gates 24, 26, and the insertion portions 130 are coupled to the second link arms 110 described below. Hole portions (not shown) are formed in these insertion portions 130, and penetrate in a direction perpendicular to the extension direction of the movable bodies 120.

In the movable bodies 120 of the rod bodies 114a, 114b housed in the first and second divided gates 24, 26, the end portions of the thick shaft portions 80 face toward the gate holes 122, and end portions of the thin shaft portions 128 and the small diameter portions 76 are inserted in rod holes 132 at the width direction center.

The second link arms 110 are formed in, for example, substantially L cross-sectional shape, are housed inside the first and second divided gates 24, 26, and include centers turnably supported with respect to the first and second divided gates 24, 26 by support shafts 134. The second link arms 110 include the one end portions at which third lock pins 112 are pivotally supported via the link pins 54c and the other end portions that are formed in bifurcated U cross-sectional shape. The insertion portions 130 of the thin shaft portions 128 are inserted inside the second link arms 110 and coupled to each other by link pins 54d inserted in hole portions (not shown) of the insertion portions 130.

The third lock pins 112 are formed by shafts that are formed to have substantially fixed diameters similar to the first lock pins 44, are arranged movably in the vertical direction (directions of arrows C1, C2) under a guiding action of a guiding unit that is not shown, and include upper end portions that are pivotally supported with respect to the second link arms 110 and other end portion sides (arrow C2 direction) that are inserted in second pin holes 138 of the support frame 18.

The third lock pins 112 have the lengths formed short substantially parallel to the first lock pins 44 and along the axial direction (arrow C2 direction) with respect to the first lock pins 44. At the initial position of the operation levers 40 shown in FIGS. 13 to 15, the first lock pins 44 have the lengths that are inserted in the lock holes 58 of the vehicle body frame 34 via first pin holes 136 of the support frame 18. By contrast with this, the third lock pins 112 have the lengths inserted halfway in the second pin holes 138 of the support frame 18.

When the rod bodies 114a, 114b move along the horizontal direction (directions of arrows B1, B2), the other end portion sides of the second link arms 110 integrally turn pivotally around the support shafts 134, and then the third lock pins 112 supported at one end portions of the second link arms 110 perform an advancing/retreating operation in the vertical direction (directions of arrows C1, C2).

As described above, the one opening/closing switching unit 102 arranged in the first divided gate 24 and the first gate frame body 20, and the other opening/closing switching unit 104 arranged in the second divided gate 26 and the second gate frame body 22 are formed symmetrically with respect to a width direction center of the rear gate 14.

Figure 18:
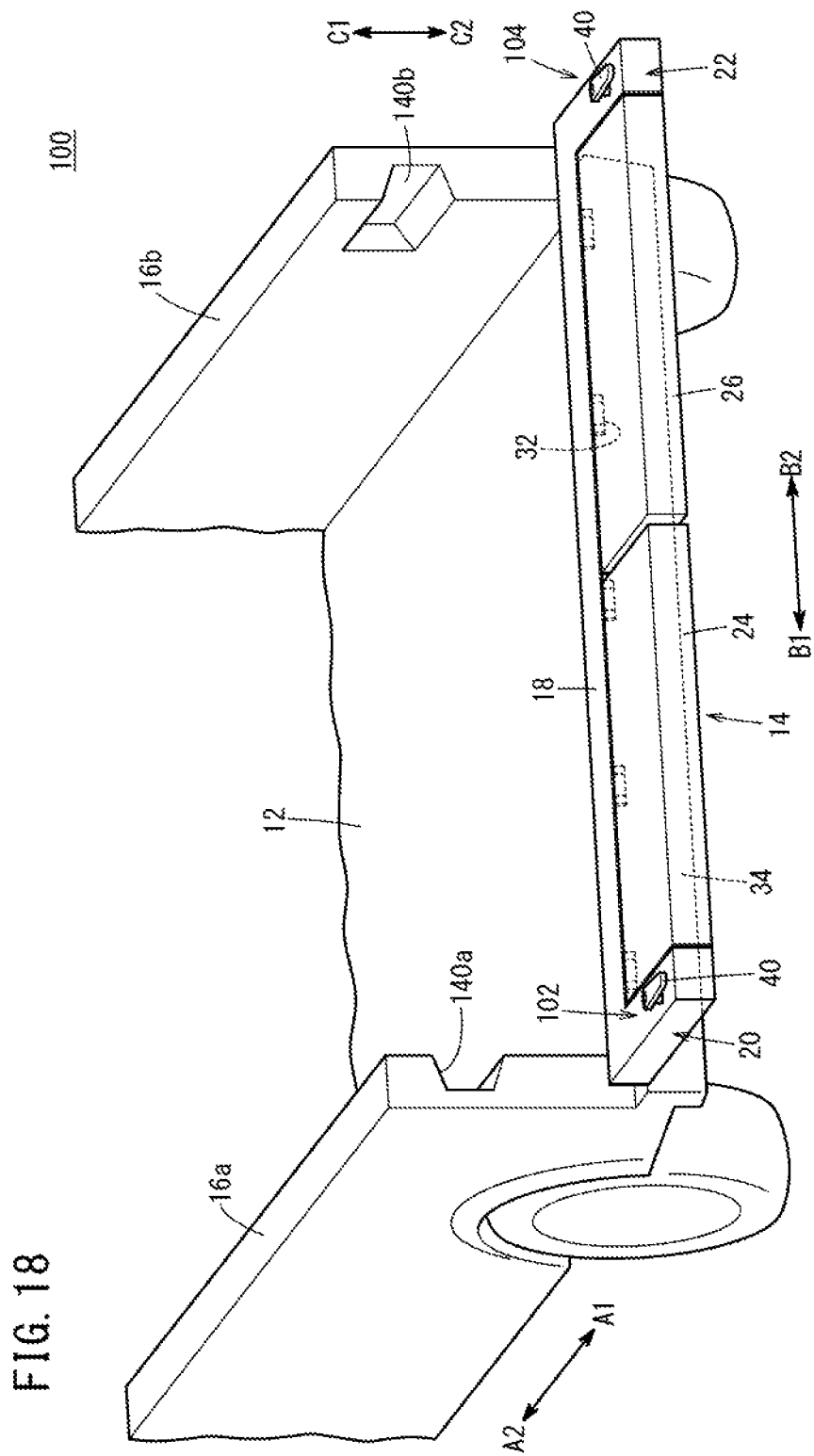
FIG. 18 is an external appearance perspective view of the proximity of the rear end of the truck showing a state of the rear gate vertically opened from the cargo bed.

That is, as shown in FIGS. 12 and 13, the operation lever 40 of the one opening/closing switching unit 102 and the operation lever 40 of the other opening/closing switching unit 104 are at the same height in the height direction (directions of arrows C1, C2) of the truck 100. As shown in FIG. 18, a pair of recess portions 140a, 140b are formed in inner wall surfaces of the side gates 16a, 16b, house the operation levers 40, recess outwardly in the vehicle width direction and toward the vehicle front side (arrow A2 direction), and are formed at the same height.

The cargo bed gate opening/closing mechanism of the truck 100 according to the second embodiment of the present invention is basically configured as described above. Next, an operation, a function and an effect of the cargo bed gate opening/closing mechanism will be described.

First, when the rear gate 14 shown in FIG. 12 is to be fixed to the bed 12 in a fully locked state, as shown in FIGS. 13 to 15 and 21A, the operation levers 40 of the pair of the opening/closing switching units 102, 104 are at the initial positions, and the first link arms 106 coupled to these operation levers 40 are at predetermined positions. Thus, the first lock pins 44 are inserted in the lock holes 58 of the vehicle body frame 34 via the first pin holes 136 of the support frame 18, and the support frame 18 is fixed to the vehicle body frame 34 via the first lock pins 44. As a result, the rear gate 14 including the support frame 18 is restricted from turning toward the rear side (the arrow A1 direction in FIG. 18) in the vertical opening locked state.

Simultaneously, when the second link arms 110 coupled to the rod mechanisms 108 are at the predetermined positions, the third lock pins 112 are inserted in the second pin holes 138 of the support frame 18. Thus, sides of the width direction center portions of the first and second divided gates 24, 26 are fixed to the support frame 18 by the third lock pins 112, and the first and second divided gates 24, 26 are restricted from turning from the first and second gate frame bodies 20, 22 in the left and right directions in the horizontally opened state.

That is, when the operation levers 40 of the pair of opening/closing switching units 102, 104 are at the initial positions, the rear gate 14 is restricted from vertically opening toward the vehicle rear side and from horizontally opening (swinging open) pivotally around the first and second gate frame bodies 20, 22 in the fully locked state.

Figure 16:
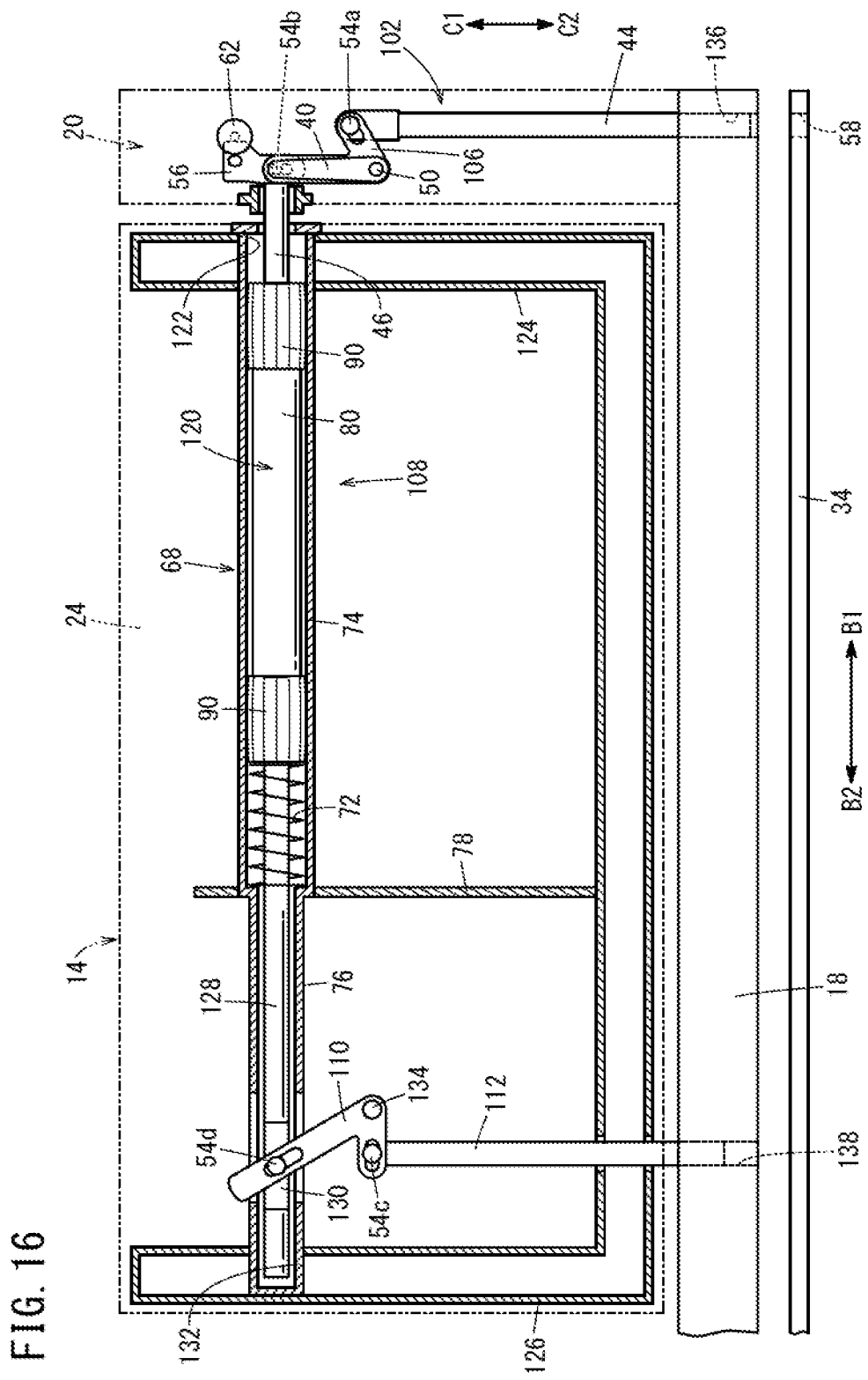
FIG. 16 is an enlarged cross-sectional view of the first divided gate showing the state where the rear gate is locked from horizontally opening and is unlocked to vertically open.
Figure 21A:
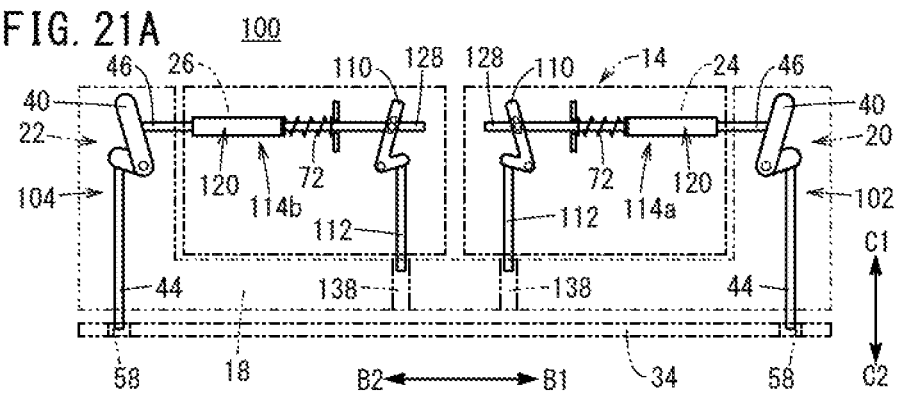
FIG. 21A is a schematic configuration front view showing a fully locked state of the rear gate shown in FIG. 12, which is fixed to the cargo bed by the opening/closing switching units.
Figure 21B:
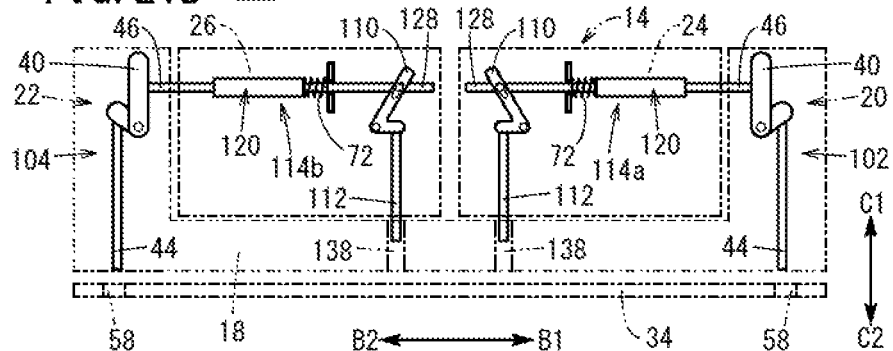
FIG. 21B is a schematic configuration front view showing a state of the rear gate vertically openable from the cargo bed.

Next, when the rear gate 14 is to be turned toward the rear side (arrow A1 direction) and is to be vertically opened as shown in FIG. 18 from the fully locked state of the rear gate 14 fixed to the bed 12, as shown in FIGS. 16 and 21B, the operator who is not shown grips the operation levers 40 at the initial positions to turn other end portion sides of the operation levers 40 by predetermined angles in directions to approach each other toward the first and second divided gates 24, 26, and place the operation levers 40 at vertically openable positions.

That is, as shown in FIG. 21B, the other end portions of the operation levers 40 extend in the vertical direction.

Thus, when the operation levers 40 and the first link arms 106 turn together, then the first lock pins 44 are lifted upward (arrow C1 direction) and the lower end portions of the first lock pins 44 are removed from the lock holes 58 of the vehicle body frame 34, the support frame 18 is released from a turn restricted state with respect to the vehicle body frame 34.

When the movable bodies 120 move toward the width direction centers of the first and second divided gates 24, 26 accompanying the operations of the operation levers 40, the second link arms 110 turn pivotally around the support shafts 134, and the third lock pins 112 go downward and are further inserted deep in the second pin holes 138. Therefore, the first and second divided gates 24, 26 are held with the width direction end portion sides fixed to the support frame 18, and are not horizontally opened from this support frame 18.

As a result, as shown in FIG. 18, the rear gate 14 is vertically opened such that the support frame 18, the first and second gate frame bodies 20, 22, and the first and second divided gates 24, 26 integrally turn toward the vehicle rear side (arrow A1 direction) via the first hinges 32. In this case, the rear gate 14 is turned by approximately 90° by the first hinges 32 and held in the horizontal state of the rear gate 14 substantially coplanar with the bed 12.

Figure 17:
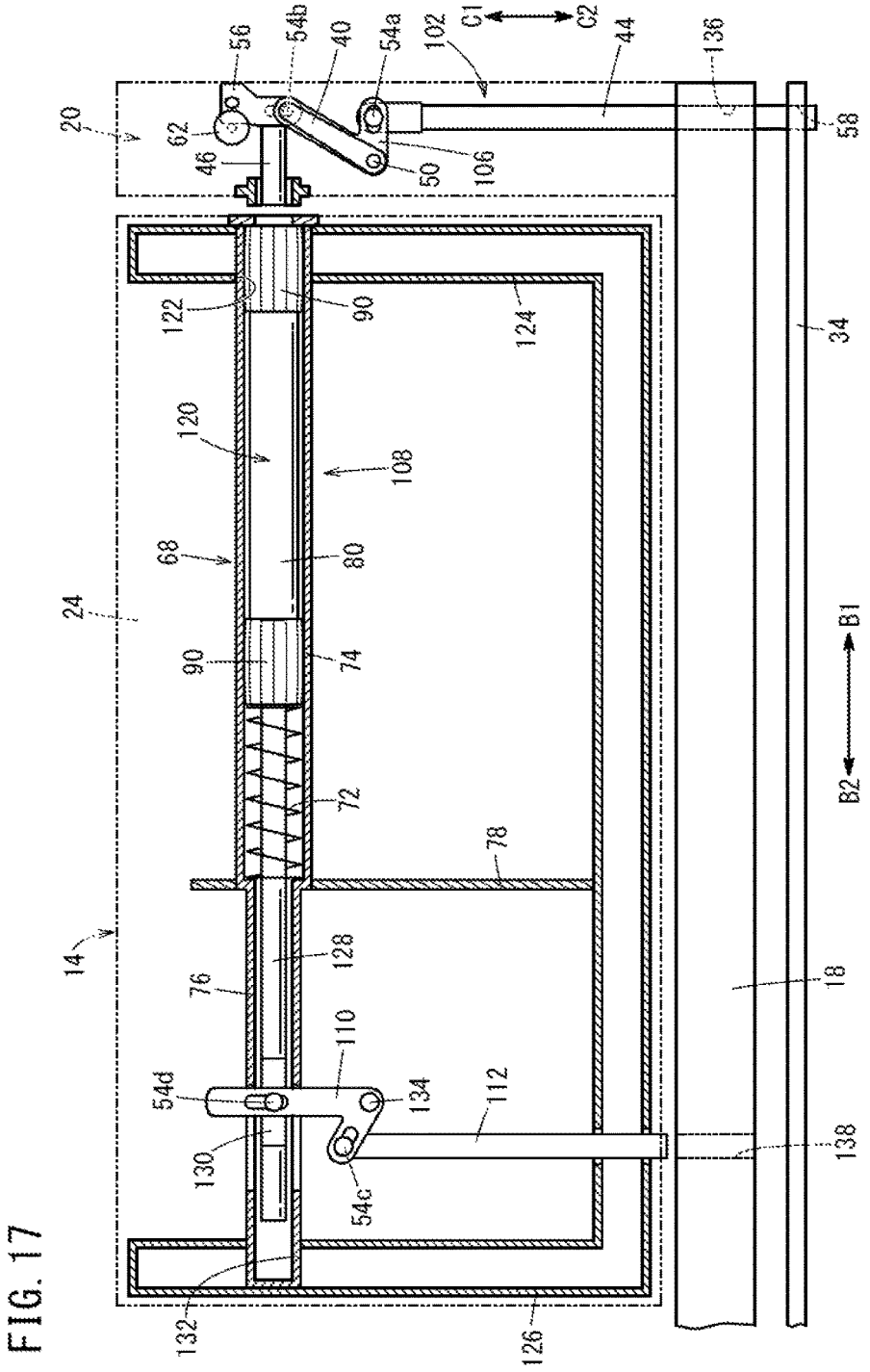
FIG. 17 is an enlarged cross-sectional view of the first divided gate showing the state where the rear gate is locked from vertically opening and is unlocked to horizontally open.
Figure 19:
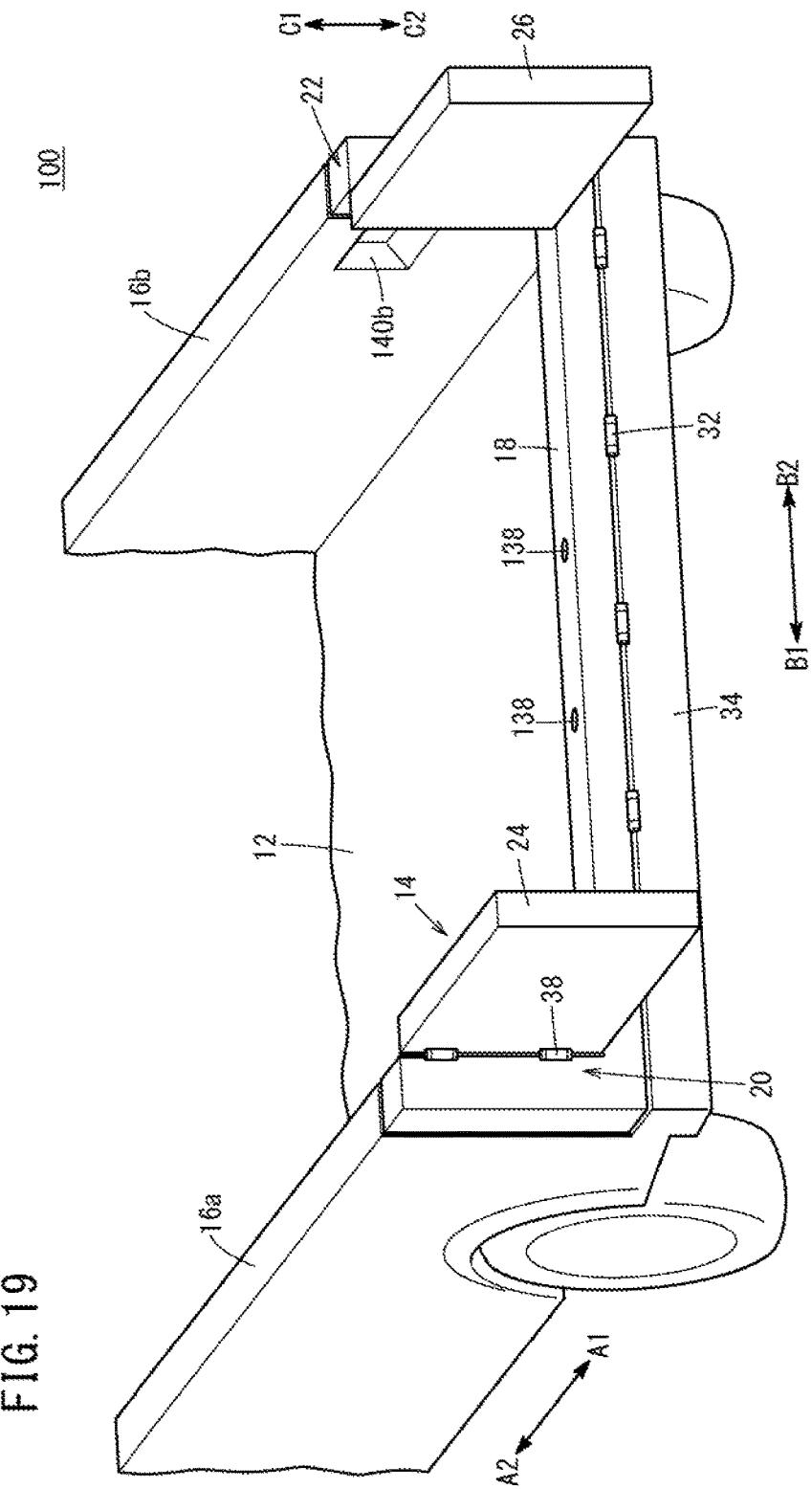
FIG. 19 is an external appearance perspective view of the proximity of the rear end of the truck showing a state of the first and second divided gates of the rear gate horizontally opened from the cargo bed.
Figure 21C:
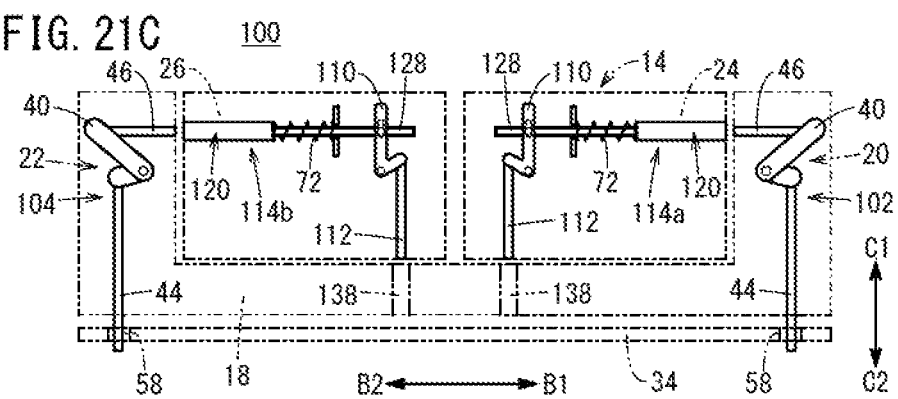
FIG. 21C is a schematic configuration front view showing a state of the rear gate horizontally openable from the first and second gate frame bodies.

Next, when the first and second divided gates 24, 26 are turned in the left and right directions and are horizontally opened (like a double-leaf door) shown in FIG. 19 from the fully locked state of the rear gate 14 fixed to the bed 12, as shown in FIGS. 17 and 21C, the operation levers 40 at the initial positions are turned by predetermined angles in directions to move away from the first and second divided gates 24, 26, and are placed at horizontal openable positions. Thus, the operation levers 40 and the first link arms 106 turn together, and then the first lock pins 44 move downward (arrow C2 direction) and are further inserted deep in the lock holes 58 of the vehicle body frame 34. Thus, a turn restricted state of the support frame 18 with respect to the vehicle body frame 34 is maintained, and the vertical opening locked state where the rear gate 14 is locked from vertically opening is maintained.

Meanwhile, operating the operation levers 40 horizontally moves the rod bodies 114a, 114b in directions to move away from center portions of the first and second divided gates 24, 26, and then the second link arms 110 turn. In this case, other end portions of the second link arms 110 extend in the vertical direction. Thus, the third lock pins 112 are pulled upward (arrow C1 direction), and lower end portions of the third lock pins 112 are removed from the second pin holes 138 of the support frame 18. Thus, the first and second divided gates 24, 26 are released from turn restricted states with respect to the support frame 18.

As a result, in a state where, as shown in FIG. 19, the support frame 18 and the first and second gate frame bodies 20, 22 are fixed to the vehicle body frame 34, the rear gate 14 is horizontally opened in the left and right directions such that the first divided gate 24 is pivotal around the width direction end portion supported by the first gate frame body 20, the second divided gate 26 is pivotal around the width direction end portion supported by the second gate frame body 22, and the width direction centers move away from each other.

Figure 20:
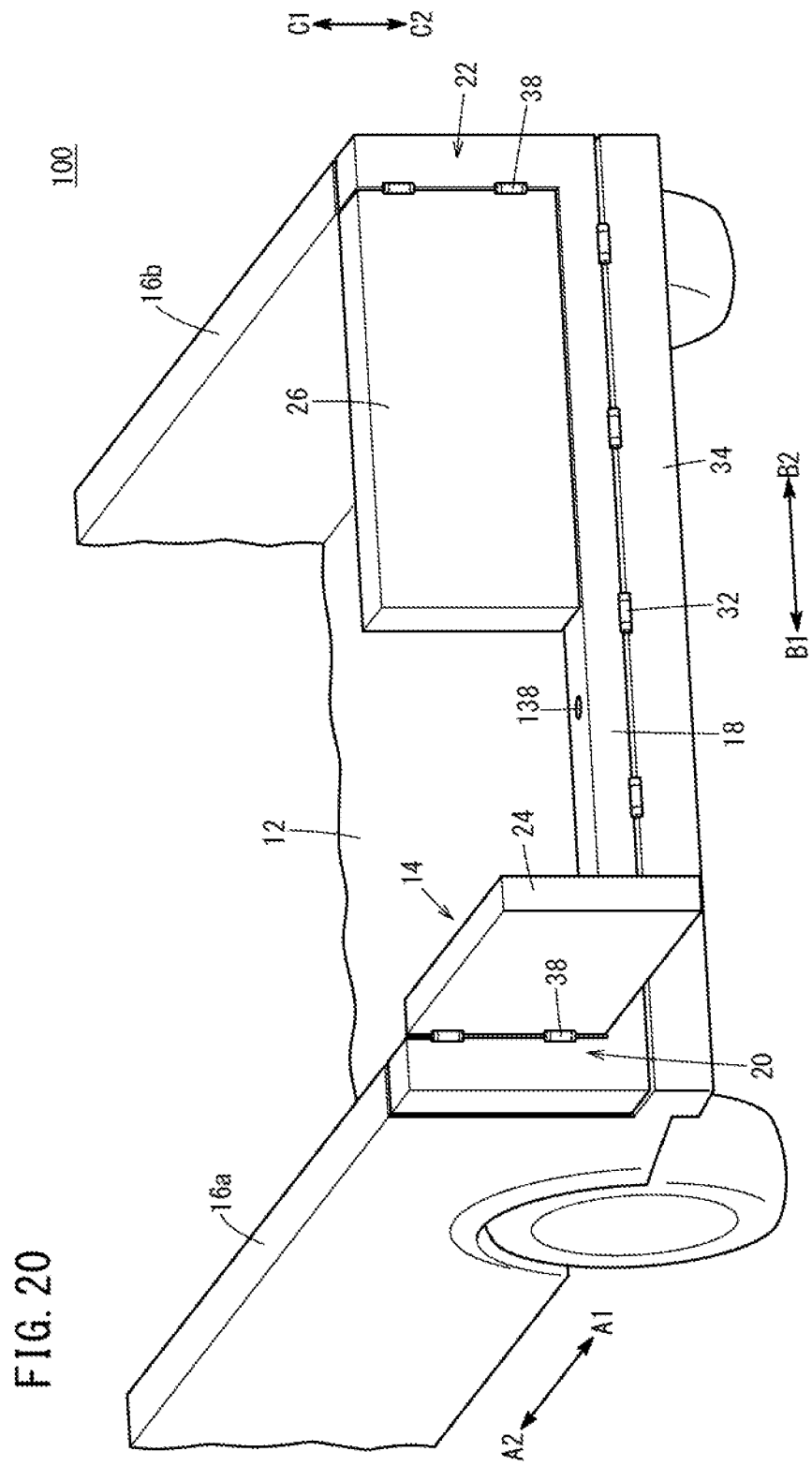
FIG. 20 is an external appearance view of the proximity of the rear end of the truck showing a state of only the first divided gate horizontally opened from the cargo bed shown in FIG. 19.
Figure 21D:
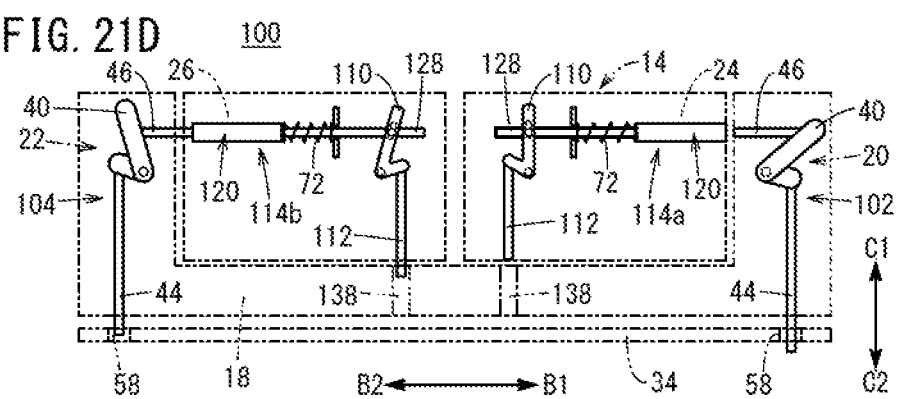
FIG. 21D is a schematic configuration front view showing a state where the first divided gate is horizontally openable, and the second divided gate is locked from horizontally opening.

Finally, when, for example, only the first divided gate 24 that forms the rear gate 14 is turned and horizontally opened (like a double-leaf door) as shown in FIG. 20 from the fully locked state of the rear gate 14 fixed to the bed 12, as shown in FIG. 21D, the operation lever 40 of the opening/closing switching unit 102 arranged on a side of the first divided gate 24 to be horizontally opened is operated to move the rod mechanisms 108 in a direction (arrow B1 direction) to move away from the second divided gate 26, remove the third lock pins 112 from the second pin holes 138 and thereby the first divided gate 24 is released from a horizontal opening restricted state. In this case, the opening/closing switching unit 104 arranged in the second divided gate 26 is not operated, so that the horizontal opening restricted state of the second divided gate 26 is maintained.

Thus, as shown in FIG. 20, the rear gate 14 is not vertically opened in a state of the support frame 18 and the first and second gate frame bodies 20, 22 fixed to the vehicle body frame 34, and only the first divided gate 24 is horizontally opened from the width direction center pivotally around the width direction end portion supported by the first gate frame body 20.

When only the second divided gate 26 is horizontally opened, only the other opening/closing switching unit 104 may be operated in the fully locked state to release the horizontal opening restricted state of the second divided gate 26, and the one opening/closing switching unit 102 may maintain the horizontal opening restricted state of the first divided gate 24.

As described above, according to the second embodiment, the rear gate 14 arranged at the rear end of the bed 12 of the truck 100 includes the first and second gate frame bodies 20, 22 that are vertically arranged at both vehicle width direction ends and openably support the first and second divided gates 24, 26 divided into two. The first and second gate frame bodies 20, 22 include the pair of the opening/closing switching units 102, 104 that can selectively switch between vertical opening and horizontal opening of the rear gate 14.

By operating the operation levers 40 arranged in the opening/closing switching units 102, 104 in the predetermined directions, the first lock pins 44 that are movable in the vertical direction are inserted in the vehicle body frame 34 to lock the rear gate 14 from vertically opening toward the rear side of the vehicle body frame 34. Meanwhile, by operating the operation levers 40 in the opposite direction, the third lock pins 112 arranged near the center portions of the first and second divided gates 24, 26 are moved in the vertical direction and are inserted in the support frame 18 to lock the rear gate 14 from horizontally opening in the left and right directions with respect to the support frame 18. By moving the first and third lock pins 44, 112 toward the support frame 18 under the operating actions of the operation levers 40, both of vertical opening and horizontal opening are locked in the fully locked state.

Consequently, compared to the cargo bed gate opening/closing mechanism according to the conventional technique of switching between vertical opening and horizontal opening of a rear gate of a truck by a plurality of lock mechanisms, a simple operation of turning the operation levers 40 of one pair of opening/closing switching units 102, 104 and causing the first lock pins 44 or the third lock pins 112 to perform an advancing/retreating operation can easily and reliably switch an opened/closed state of the rear gate 14 depending on an intended use or the like. Compared to the cargo bed gate opening/closing mechanism according to the conventional technique, it is possible to reduce the number of parts by simplifying the configuration, and thereby reduce manufacturing cost and reduce the weight of the cargo bed gate opening/closing mechanism.

By operating only one of the opening/closing switching unit 102 arranged in the first divided gate 24 and the opening/closing switching unit 104 arranged in the second divided gate 26, it is possible to horizontally open only one of the first divided gate 24 and the second divided gate 26 independently. Consequently, it is possible to increase options for opening the rear gate 14 depending on an intended use or the like of the bed 12.

The rear gate 14 includes the pair of opening/closing switching units 102, 104. Consequently, it is possible to more reliably and stably switch the opened/closed state of the rear gate 14. Even when, for example, a failure occurs in the one opening/closing switching unit 102 (104), the other opening/closing switching unit 104 (102) reliably maintains the locked state.

The operation levers 40 are configured to switch all opened/closed states, and operation positions that enable vertical opening and operation positions that enable horizontal opening are different. Consequently, the vertical opening and the horizontal opening are prevented from being simultaneously performed by mistake.

That is, an operation of unlocking vertical opening is configured to reliably maintain the horizontal opening locked state. By contrast, an operation of unlocking the horizontal opening is configured to reliably maintain the vertical opening locked state. In other words, an operation of performing one of the vertical opening and the horizontal opening is configured to be able to maintain the locked state of the gate that is not opened.

The one opening/closing switching unit 102 and the other opening/closing switching unit 104 are configured to be symmetrical with respect to the width direction center of the rear gate 14. Consequently, it is possible to arrange the operation levers 40 at the same height in the height direction (directions of arrows C1, C2) of the truck 100, enhance operability for the operator who is not shown to operate the operation levers 40 and make a weight distribution and strength of the first divided gate 24 and the second divided gate 26 substantially the same.

The first and second divided gates 24, 26 are horizontally opened not only at the substantially center portion along the width direction of the rear gate 14, but also may be configured to be dividable into two and openable at any of portions in the width direction (directions of arrows B1, B2).

Compared to the first and second opening/closing switching units 28, 30 according to the first embodiment, it is possible to simplify the configurations of the rod mechanisms 108 of the opening/closing switching units 102, 104 and consequently reduce manufacturing cost and reduce the weight of the cargo bed gate opening/closing mechanism.

The cargo bed gate opening/closing mechanism of the truck according to the present invention is not limited to the above embodiment, and can employ various configurations without departing from the scope of the present invention.

What is claimed is:
1. A cargo bed gate opening-and-closing mechanism of a truck configured to switch between an opened state and a closed state of the cargo bed gate of the truck, the truck including the cargo bed gate openably provided at a rear end of a cargo bed, wherein the cargo bed gate is surrounded by a support frame member on both sides of the cargo bed gate located in a width direction of the truck and on a lower side of the cargo bed gate, and the cargo bed gate includes two gate members disposed side by side in the width direction, and the cargo bed gate includes a first rod housed inside thereof and extending in the width direction, wherein the support frame member includes:

a first frame portion configured to support an end of the cargo bed gate in the width direction; and a second frame portion configured to support a lower portion of the cargo bed gate, and the first frame portion includes a second rod housed inside thereof, the second rod penetrating the second frame portion in an up-and-down direction of the truck and provided movably in the up-and-down direction toward and away from a main body of the truck, and wherein the cargo bed gate is configured to open by pivotal movement about an axis extending in the width direction when the first rod is inserted inside the first frame portion, and the second rod retreats from the main body and into the second frame portion, and the cargo bed gate is configured to enable the two gate members to open respectively by pivotal movement about an axis extending in the up-and-down direction when the first rod retreats from the first frame portion and the second rod moves toward the main body.

2. The cargo bed gate opening-and-closing mechanism of the truck according to claim 1, wherein the first rod includes:

a body fixed to the cargo bed gate; and a movable body provided inside the body and provided movably along an axial direction of the first rod, and wherein the movable body is pressed by a piston coupled to an operating unit provided in the first frame portion.

3. The cargo bed gate opening-and-closing mechanism of the truck according to claim 2, wherein the first and second rods are configured to be supported by the operating unit, and the first rod is configured to perform an advancing-and-retreating operation along the axial direction of the first rod by operating the operating unit, the second rod is configured to perform an advancing-and-retreating operation along an axial direction of the second rod by operating the operating unit.

4. The cargo bed gate opening-and-closing mechanism of the truck according to claim 1, wherein each of the two gate members includes the first rod, and the first rod of one of the two gate members is configured to be inserted in the other of the two gate members to restrict the opening of the two gate members.

5. The cargo bed gate opening-and-closing mechanism of the truck according to claim 1, wherein the first rod is connected with a third rod configured to be movable in the up-and-down direction toward and away from the second frame portion accompanying an advancing and retreating operation of the first rod, and configured to move in a direction opposite to an advancing or retreating direction of the second rod.

6. The cargo bed gate opening-and-closing mechanism of the truck according to claim 5, wherein the third rod is provided near a center of the cargo bed gate in the width direction.

* * * * *